(12) United States Patent
Jeong et al.

(10) Patent No.: US 11,761,372 B2
(45) Date of Patent: Sep. 19, 2023

(54) MULTI-WAY COOLANT VALVE AND HEAT PUMP SYSTEM HAVING THE SAME

(71) Applicants: Hyundai Motor Company, Seoul (KR); Kia Corporation, Seoul (KR)

(72) Inventors: Seong-Bin Jeong, Hwaseong-si (KR); Dong Seok Oh, Hwaseong-si (KR); Namho Park, Suwon-si (KR); Yeonho Kim, Seoul (KR); Man Hee Park, Suwon-si (KR); Jae Yeon Kim, Hwaseong-si (KR); Wan Je Cho, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

(21) Appl. No.: 17/724,757

(22) Filed: Apr. 20, 2022

(65) Prior Publication Data

US 2023/0065082 A1 Mar. 2, 2023

(30) Foreign Application Priority Data

Aug. 30, 2021 (KR) .......................... 10-2021-0114818

(51) Int. Cl.
*F01P 7/16* (2006.01)
*F01P 5/12* (2006.01)
*F04D 5/00* (2006.01)
*F04D 29/18* (2006.01)
(Continued)

(52) U.S. Cl.
CPC ................. *F01P 7/161* (2013.01); *F01P 5/12* (2013.01); *F04D 5/002* (2013.01); *F04D 15/0038* (2013.01); *F04D 29/188* (2013.01); *F01P 2007/146* (2013.01); *F05D 2270/64* (2013.01)

(58) Field of Classification Search
CPC ........................... F01P 7/161; F01P 2007/146
See application file for complete search history.

(56) References Cited

U.S. PATENT DOCUMENTS 9,523,434 B2 * 12/2016 Nagahama ............ F16K 5/0471
2003/0098077 A1 * 5/2003 McLane .............. F16K 11/0856
137/625.47

(Continued)

*Primary Examiner* — Long T Tran
(74) *Attorney, Agent, or Firm* — MORGAN, LEWIS & BOCKIUS LLP

(57) ABSTRACT

A multi-way coolant valve and a heat pump system having the same include an external housing in which first, second and third external inlets and first, second and third external outlets are formed; and an internal housing provided rotatably inside the external housing to selectively fluidically-connect the first, second and third external inlets, and the first, second and third external outlets, and divided into two stages through which a coolant flows respectively, wherein as the internal housing rotates at a predetermined interval in a selected mode of the vehicle, the first external inlet selectively fluidically-communicates with the first external outlet, the second external outlet, or the third external outlet, the second external inlet selectively fluidically-communicates with the first external outlet or the second external outlet, and the third external inlet selectively fluidically-communicates with the first external outlet, the second external outlet, or the third external outlet.

23 Claims, 23 Drawing Sheets

(51) Int. Cl.
*F04D 15/00* (2006.01)
*F01P 7/14* (2006.01)

(56) References Cited

U.S. PATENT DOCUMENTS

| | | | |
|---|---|---|---|
| 2006/0118066 A1* | 6/2006 | Martins | F16K 11/0856 123/41.08 |
| 2015/0354716 A1* | 12/2015 | Morein | F16K 11/0853 137/625.47 |
| 2016/0031291 A1* | 2/2016 | Enomoto | B60K 11/02 62/189 |
| 2016/0040585 A1* | 2/2016 | Schaefer | F16K 11/202 137/594 |
| 2016/0167481 A1* | 6/2016 | Makihara | B60H 1/00485 237/5 |
| 2017/0130849 A1* | 5/2017 | Demitroff | F16K 11/0853 |
| 2018/0112782 A1* | 4/2018 | Lee | F16K 11/065 |
| 2019/0211738 A1* | 7/2019 | Yoshimura | F01P 7/165 |
| 2020/0224777 A1* | 7/2020 | Ma | F16K 11/10 |
| 2021/0381607 A1* | 12/2021 | Koch | F16K 11/076 |
| 2022/0074510 A1* | 3/2022 | Kim | F16K 11/074 |

\* cited by examiner

MULTI-WAY COOLANT VALVE AND HEAT PUMP SYSTEM HAVING THE SAME

CROSS-REFERENCE TO RELATED APPLICATION

The present application claims priority to Korean Patent Application No. 10-2021-0114818 filed on Aug. 30, 2021, the entire contents of which is incorporated herein for all purposes by this reference.

BACKGROUND OF THE PRESENT DISCLOSURE

Field of the Present Disclosure

The present disclosure relates to a multi-way coolant valve and a heat pump system having the same. More particularly, the present disclosure relates to a multi-way coolant valve for forming a plurality of coolant flow paths that can simplify a configuration and to a heat pump system having the same.

Description of Related Art

Generally, an air condition system for a vehicle includes an air conditioning device circulating a refrigerant to heat or cool an interior of the vehicle.

The air conditioning device, which is to maintain the interior of the vehicle at an appropriate temperature regardless of a change in an external temperature to maintain a comfortable internal environment, is configured to heat or cool the interior of the vehicle by heat exchange by an evaporator in a process in which a refrigerant discharged by driving of a compressor is circulated to the compressor through a condenser, a receiver drier, an expansion valve, and the evaporator.

That is, the air conditioning device lowers a temperature and a humidity of the interior by condensing a high-temperature high-pressure gas-phase refrigerant compressed from the compressor by the condenser, passing the refrigerant through the receiver drier and the expansion valve, and then evaporating the refrigerant in the evaporator in a cooling mode in summer.

On the other hand, nowadays, while interest in energy efficiency and an environment pollution problem increases, development of an environment-friendly vehicle that can substantially replace an internal combustion engine vehicle is requested, and such an environment-friendly vehicle is classified into an electric vehicle which is driven using a fuel cell or electricity as a power source, and a hybrid vehicle which is driven using an engine and an electric battery.

In the electric vehicle or the hybrid vehicle among these environmentally friendly vehicles, a separate heater is not used, unlike an air conditioner of a general vehicle, and an air conditioner used in the environmentally friendly vehicle is generally known as a heat pump system.

Meanwhile, the electric vehicle generates driving force by converting chemical reaction energy between oxygen and hydrogen into electrical energy. In the present process, thermal energy is generated by a chemical reaction in a fuel cell. Therefore, it is necessary in securing performance of the fuel cell to effectively remove generated heat.

Furthermore, the hybrid vehicle generates driving force by driving a motor using electricity supplied from the fuel cell described above or an electrical battery, together with an engine operated by a general fuel. Therefore, heat generated from the fuel cell or the battery and the motor should be effectively removed to secure performance of the motor.

Therefore, in the hybrid vehicle or the electric vehicle according to the related art, a cooling device, a heat pump system, and a battery cooling system should be configured using separate closed circuits, respectively, to prevent heat generation in the motor, an electrical component, and the battery including the fuel cells.

Accordingly, size and weight of a cooling module provided at the front of the vehicle are increased, and a layout of connection pipes supplying a coolant or a refrigerant to each of the heat pump system, the cooling device, and the battery cooling system in an engine compartment becomes complicated.

Furthermore, because the battery cooling system heating or cooling the battery depending on a state of the vehicle is separately provided so that the battery exhibits optimal performance, a plurality of valves for connecting the respective connection pipes to each other are applied and then there is a problem that the overall manufacturing cost of the vehicle increases.

The information disclosed in this Background of the present disclosure section is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a multi-way coolant valve apparatus which may simplify a system layout and reduce a manufacturing cost by forming a plurality of coolant flow paths through one coolant valve, and a heat pump system provided with the same.

Furthermore, various aspects of the present disclosure are directed to providing a multi-way coolant valve apparatus which may form a plurality of cooling flow paths according to a selected mode of the vehicle in one valve through simple control, and a heat pump system provided with the same.

A multi-way coolant valve apparatus according to various exemplary embodiments of the present disclosure includes: an external housing in which a first external inlet, a second external inlet, a third external inlet, a first external outlet, a second external outlet, and a third external outlet are formed; and an internal housing provided rotatably inside the external housing to selectively fluidically-connect the first, second and third external inlets, and the first, second and third external outlets, and divided into two stages through which a coolant flows, respectively, wherein as the internal housing rotates at a predetermined interval in a selected mode of the vehicle, the first external inlet selectively fluidically-communicates with the first external outlet, the second external outlet, or the third external outlet, the second external inlet selectively fluidically-communicates with the first external outlet or the second external outlet, and the third external inlet selectively fluidically-communicates with the first external outlet, the second external outlet, or the third external outlet.

The internal housing may include: a hollow internal body member of which upper and lower surfaces are opened; a first partition wall partitioning the internal body member into a first internal body member and a second internal body member in a height direction of the internal body member; a tank connection portion formed at the rotation center portion of the first internal body member and communicating with the second internal body member; a pair of second partition walls formed in parallel with a gap spaced from the tank connection portion to divide the inside of the first internal body member into first, second and third internal chambers, which are vertical to the height direction thereof; a third partition wall dividing the inside of the second internal body member into fourth, fifth and sixth internal chambers spaced from each other at a predetermined angle in a circumferential direction based on the rotation center; and a plurality of penetration holes respectively formed along external circumferences of the first internal body member and the second internal body member.

A plurality of penetration holes may include: first, second, third, fourth, fifth and sixth penetration holes formed at a position spaced at a predetermined first angle along the external circumference of the first internal body member; and seventh, eighth, ninth, tenth, eleventh and twelfth penetration holes formed at a position spaced at a predetermined second angle along the external circumference of the second internal body member.

The first and fourth penetration holes may fluidically-communicate with the first internal chamber, the second and third penetration holes may fluidically-communicate with the second internal chamber, the fifth and sixth penetration holes may fluidically-communicate with the third internal chamber, the seventh and eighth penetration holes may fluidically-communicate with the fourth internal chamber, the ninth and tenth penetration holes may fluidically-communicate with the fifth internal chamber, and the eleventh and twelfth penetration holes may fluidically-communicate with the sixth internal chamber.

A water pump may be mounted on the first external outlet and the second external outlet, respectively.

The mode may include a first mode, a second mode, a third mode and a fourth mode in which the internal housing rotates at a predetermined angle inside the external housing.

In the first mode, the first external inlet may fluidically-communicate with the second external outlet through the first internal chamber through the first internal chamber, the second external inlet may fluidically-communicate with the first external outlet through the second internal chamber through the second internal chamber, and the third external inlet may fluidically-communicate with the third external outlet through the third internal chamber.

In the second mode, the first external inlet may fluidically-communicate with the first external outlet through the fourth internal chamber, the second external inlet may fluidically-communicate with the second external outlet through the fifth internal chamber, and the third external inlet may fluidically-communicate with the third external outlet through the sixth internal chamber.

In the third mode, the first external inlet may fluidically-communicate with the third external outlet through the fourth internal chamber, the second external inlet may fluidically-communicate with the first external outlet through the fifth internal chamber, and the third external inlet may fluidically-communicate with the second external outlet through the sixth internal chamber.

In the fourth mode, the first external inlet may fluidically-communicate with the third external outlet through the second internal chamber through the second internal chamber, the second external inlet may fluidically-communicate with the second external outlet through the third internal chamber, and the third external inlet may fluidically-communicate with the first external outlet through the first internal chamber.

The first, second, third, fourth, fifth and sixth penetration holes may be formed at positions staggered from the seventh, eighth, ninth, tenth, eleventh and twelfth penetration holes, respectively.

The first, second, third, fourth, fifth and sixth penetration holes may be respectively formed at positions spaced from each other at a 60° angle along a circumference of the first internal body member, and the seventh, eighth, ninth, tenth, eleventh and twelfth penetration holes may be formed respectively at positions spaced apart at a 60° angle along a circumference of the second internal body member.

The third partition wall may divide the interior of the second internal body member at a 120° angle along the circumferential direction thereof.

The external housing may further include a protruded portion protruding outwardly from the external circumference of the external housing in a position corresponding to the first, second and third external inlets and the first, second and third external outlets so that a space is respectively formed between the penetration holes respectively formed in the first internal body member and the second internal body member.

At the upper portion of the external housing, a mounting portion provided with a connection hole may be protruded to be fluidically-communicated in a state that a reservoir tank is mounted.

A driving unit connected to the rotation center portion of the internal housing and selectively rotating the internal housing from the inside of the external housing may be further included.

The first external inlet, the second external inlet, and the third external inlet may be formed at positions spaced at a 120° angle along the circumference of the external housing, and the first external outlet, the second external outlet, and third external outlet may be formed at positions spaced apart at a 120° angle along the circumference of the external housing between each of the first, second and third external inlets to be staggered with the first external inlet, the second external inlet, and the third external inlet.

A heat pump system provided with a multi-way coolant valve apparatus according to various exemplary embodiments of the present disclosure includes: the multi-way coolant valve apparatus as above-described; a first coolant line connected to the first external inlet and the third external outlet, respectively, and provided with a radiator; a battery coolant line connected to the second external inlet and the first external outlet, respectively, and provided with a battery module; and a second coolant line connected to the third external inlet and the second external outlet, respectively, and provided with an electrical component and an oil cooler, wherein a chiller connected to the air conditioning device is provided in the battery coolant line, a heat exchanger included in the air conditioning device is provided in the second coolant line, and the internal housing provided in the multi-way coolant valve apparatus is operated with a first mode, a second mode, a third mode and a fourth mode in which the internal housing rotates at a predetermined angle inside the external housing.

In the first mode, the multi-way coolant valve apparatus may connect the first coolant line to the second coolant line to supply the coolant cooled in the radiator to the electrical component and the oil cooler, and operate so that the battery coolant line forms a closed and sealed circuit independent from the first and second coolant lines.

In the second mode, the multi-way coolant valve apparatus may operate to form one circuit in which the first coolant line, the battery coolant line, and the second coolant line are connected to each other to supply the coolant cooled in the radiator to the electrical component, the oil cooler, and the battery module.

In the third mode, the multi-way coolant valve apparatus may operate so that the first coolant line, the battery coolant line, and the second coolant line respectively form an independent closed and sealed circuit, and the refrigerant may flow to the heat exchanger by the operation of the air conditioning device to recover waste heat from the electrical component and the oil cooler.

In the fourth mode, the multi-way coolant valve apparatus may operate so that the first coolant line forms an independent closed and sealed circuit, operates to form one circuit in which the battery coolant line and the second coolant line are connected to each other to recover waste heat from the electrical component and the oil cooler, and the battery module, and the refrigerant may flow to the heat exchanger and the chiller by the operation of the air conditioning device.

According to the multi-way coolant valve apparatus and the heat pump system having the same according to various exemplary embodiments of the present disclosure configured as described above, a plurality of cooling flow paths through which the coolant flows between the external housing and the internal housing are formed by the rotation of the internal housing according to the mode of the vehicle, minimizing the number of valves applied to the heat pump system, and promoting the unification and the simplification of the heat pump system.

Furthermore, the present disclosure may facilitate the valve control because a plurality of cooling flow paths is formed between the external housing and the internal housing while the internal housing is rotated at a predetermined angle interval.

Furthermore, through the simplification of the entire system, it is possible to reduce a manufacturing cost and weight, and improve space utilization.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
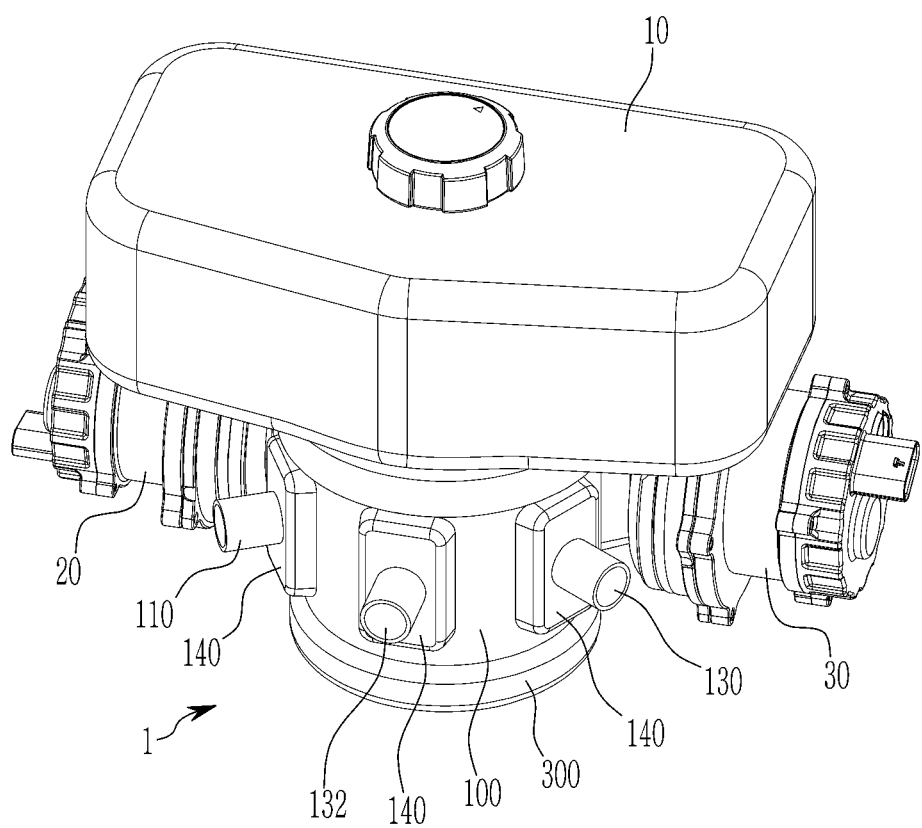
FIG. 1 is a perspective view showing a state in which a reservoir tank and a water pump are combined with a multi-way coolant valve according to various exemplary embodiments of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Various exemplary embodiments of the present disclosure will hereinafter be described in detail with reference to the accompanying drawings.

Embodiments described in the present specification and a configuration shown in the drawings are just the most preferable embodiments of the present disclosure, but are not limited to the spirit and scope of the present disclosure. Therefore, it should be understood that there may be various equivalents and modifications capable of replacing them at the time of filing of the present application.

To clarify the present disclosure, parts that are not connected to the description will be omitted, and the same elements or equivalents are referred to by the same reference numerals throughout the specification.

The size and thickness of each element are arbitrarily shown in the drawings, and the present disclosure is not necessarily limited thereto, and in the drawings, the thickness of layers, films, panels, regions, etc., are exaggerated for clarity.

Furthermore, unless explicitly described to the contrary, the word "comprise", and variations such as "comprises" or "comprising", will be understood to imply the inclusion of stated elements but not the exclusion of any other elements.

Furthermore, the terms, " . . . unit", " . . . mechanism", " . . . portion", " . . . member" etc. used herein mean the unit of inclusive components performing at least one or more functions or operations.

Figure 2:
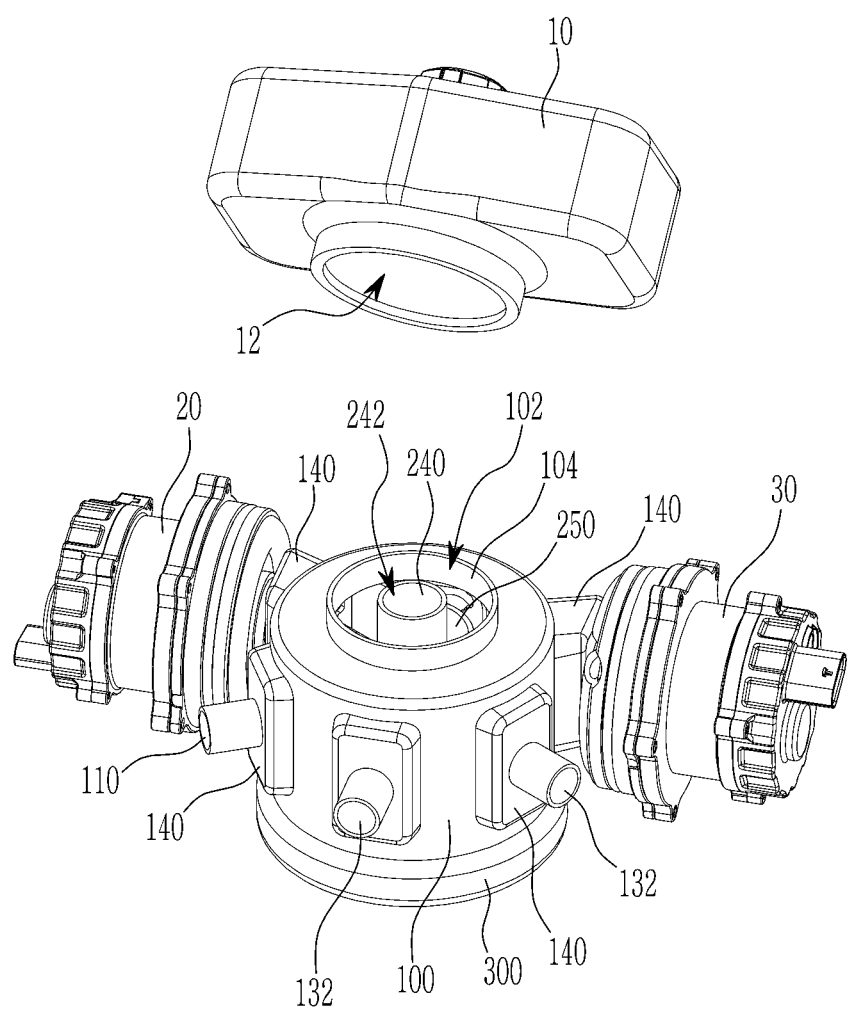
FIG. 2 is a perspective view showing a state in which a multi-way coolant valve according to various exemplary embodiments of the present disclosure is combined with water pumps.
Figure 3:
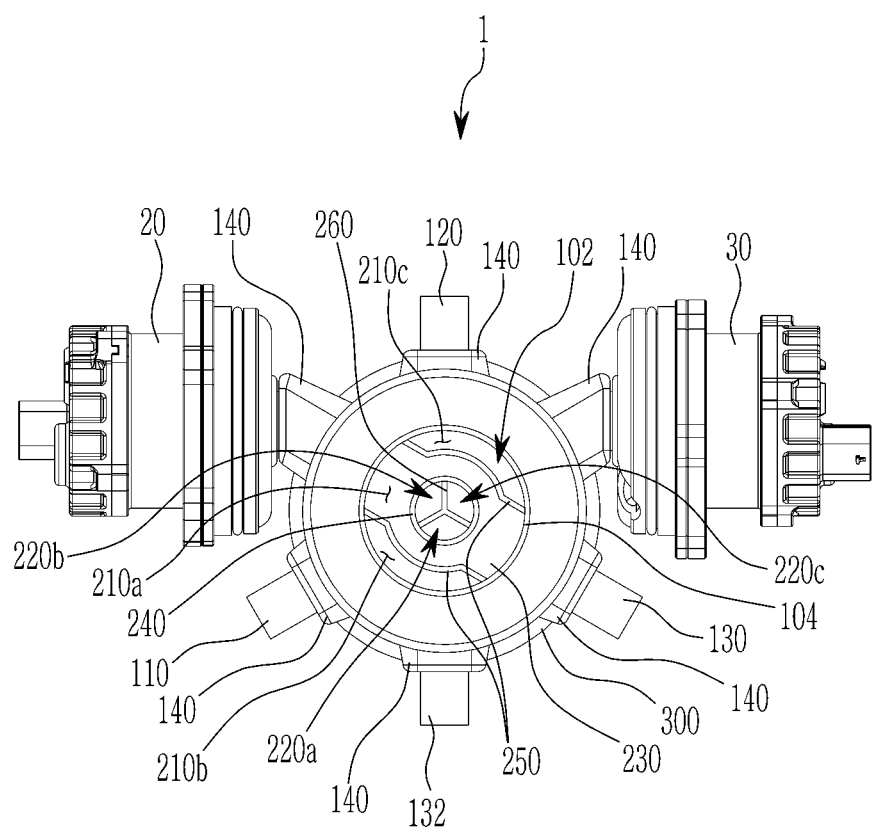
FIG. 3 is a top plan view of FIG. 2.

FIG. 1 is a perspective view showing a state in which a reservoir tank and a water pump are combined with a multi-way coolant valve according to various exemplary embodiments of the present disclosure, FIG. 2 is a perspective view showing a state in which a multi-way coolant valve according to various exemplary embodiments of the present disclosure is combined with water pumps, and FIG. 3 is a top plan view of FIG. 2.

Referring to FIG. 1 to FIG. 3, a multi-way coolant valve 1 according to various exemplary embodiments of the present disclosure may include an external housing 110, an internal housing 200 provided to be rotatable inside the external housing 100, and a driving unit 300.

A mounting portion 104 provided with a connection hole 102 may be formed to be protruded on the upper portion of the external housing 100 so that the reservoir tank 10 is fluidically communicated in a mounted state.

Here, in the reservoir tank 10, a mount hole 12 may be integrally formed so that the mounting portion 104 is inserted.

Accordingly, the reservoir tank 10 may be coupled to the external housing 100 through fusion or the like in a state that the mounting portion 104 is inserted into the mount hole 12.

On the other hand, the mounting portion 104 protrudes from the upper portion of the external housing 100 at a constant interval, so that the coolant stored in the reservoir tank 10 may be smoothly inflowed into the inside.

Furthermore, bubbles included in the coolant passing through the inside of the multi-way coolant valve 1 may be smoothly expelled to the reservoir tank 10 connected through the mounting portion 104.

Meanwhile, the first water pump 20 and the second water pump 30 may be mounted on the external housing 100, respectively. The first water pump 20 may supply the coolant to the battery coolant line 6 included in the heat pump system.

The second water pump 30 may supply the coolant to the first coolant line 2 and the second coolant line 4 included in the heat pump system.

Also, the driving unit 300 is connected to the rotation center portion of the internal housing 200, and may selectively rotate the internal housing 200 inside the external housing 100.

That is, the driving unit 300 may generate power to rotate the internal housing 200. Accordingly, the driving unit 300 may rotate the internal housing 200 at a predetermined angle inside the external housing 100 so that the inflowed coolant forms a plurality of flow paths.

The driving unit 300 is mounted on a lower portion of the external housing 100, and a rotation shaft of the driving unit 300 may be connected to the rotation center portion of the internal housing 200.

The driving unit 300 configured as described above may be implemented through a stepping motor or a solenoid to rotate the internal housing 200 at a predetermined angle according to the selected mode of the vehicle.

Hereinafter, the configuration of the external housing 100 and the internal housing 200 is described in detail with reference to appended drawings.

Figure 4:
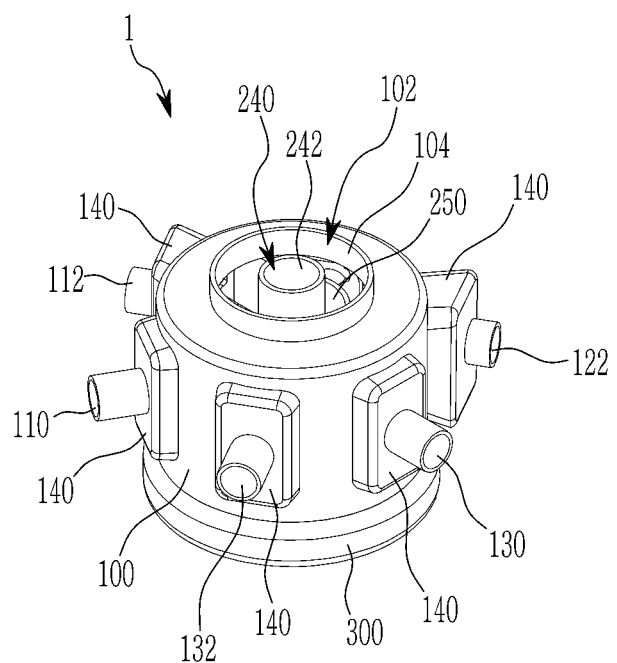
FIG. 4 is a perspective view of a multi-way coolant valve according to various exemplary embodiments of the present disclosure.
Figure 5:
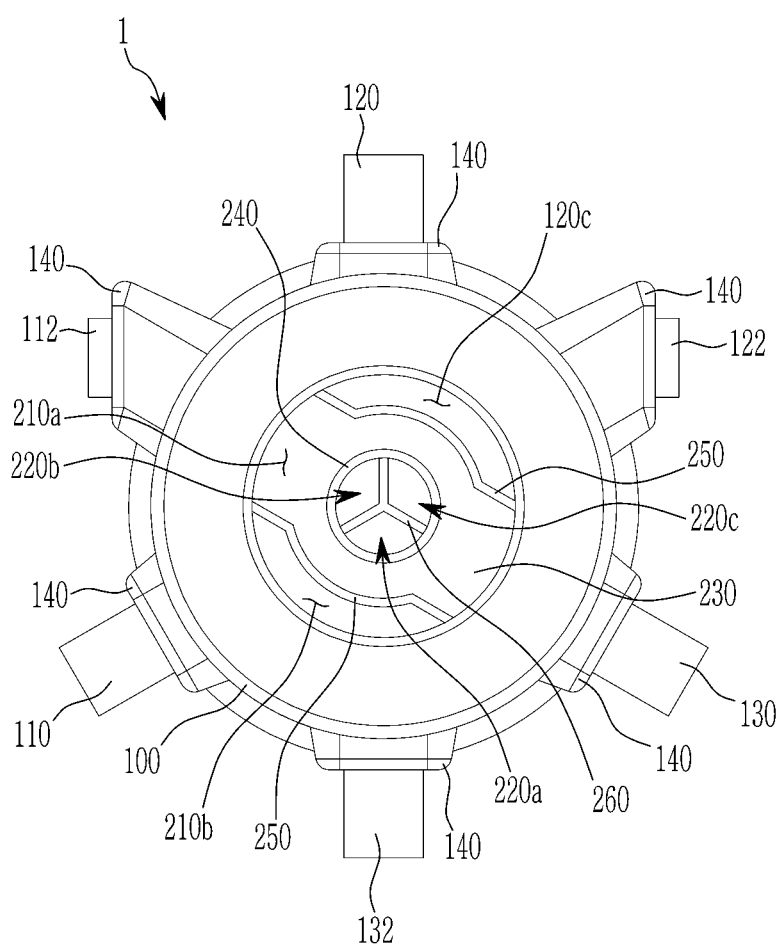
FIG. 5 is a top plan view of a multi-way coolant valve according to various exemplary embodiments of the present disclosure.
Figure 6:
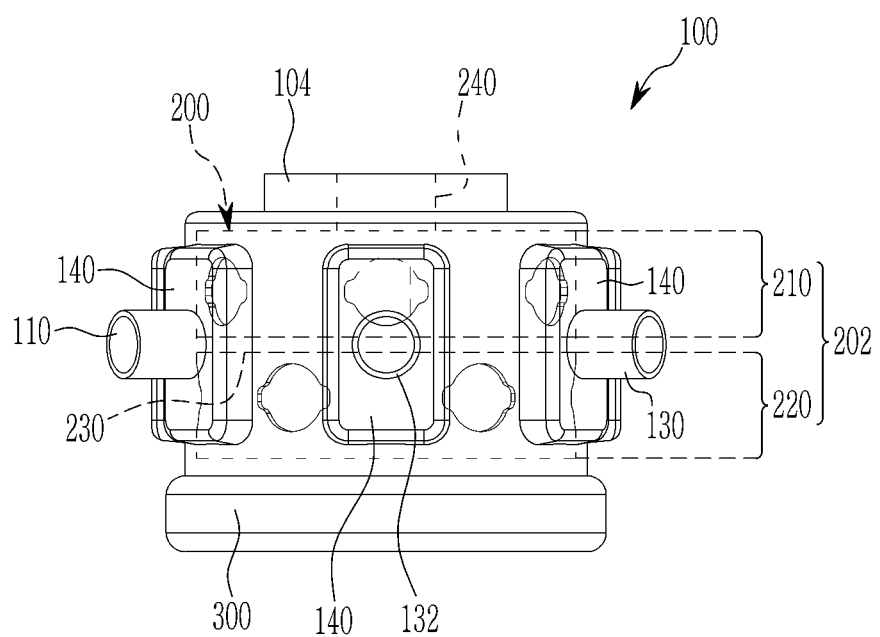
FIG. 6 is a projection front view of a multi-way coolant valve according to various exemplary embodiments of the present disclosure.
Figure 7:
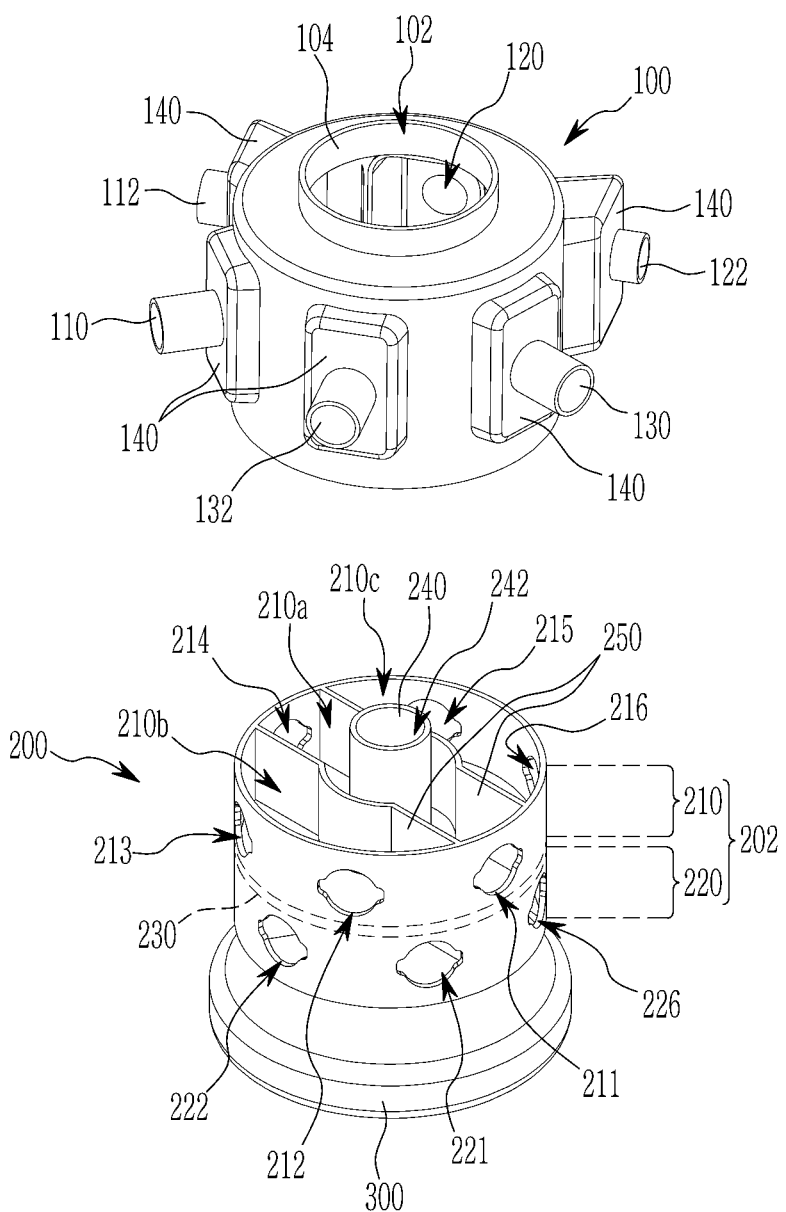
FIG. 7 is an exploded perspective view of a multi-way coolant valve according to various exemplary embodiments of the present disclosure.
Figure 8:
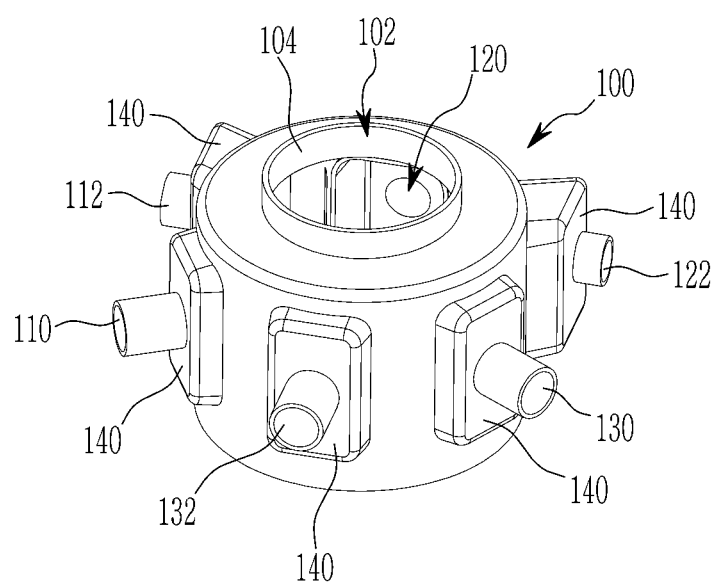
FIG. 8 is a perspective view of an external housing applied to a multi-way coolant valve according to various exemplary embodiments of the present disclosure.
Figure 9:
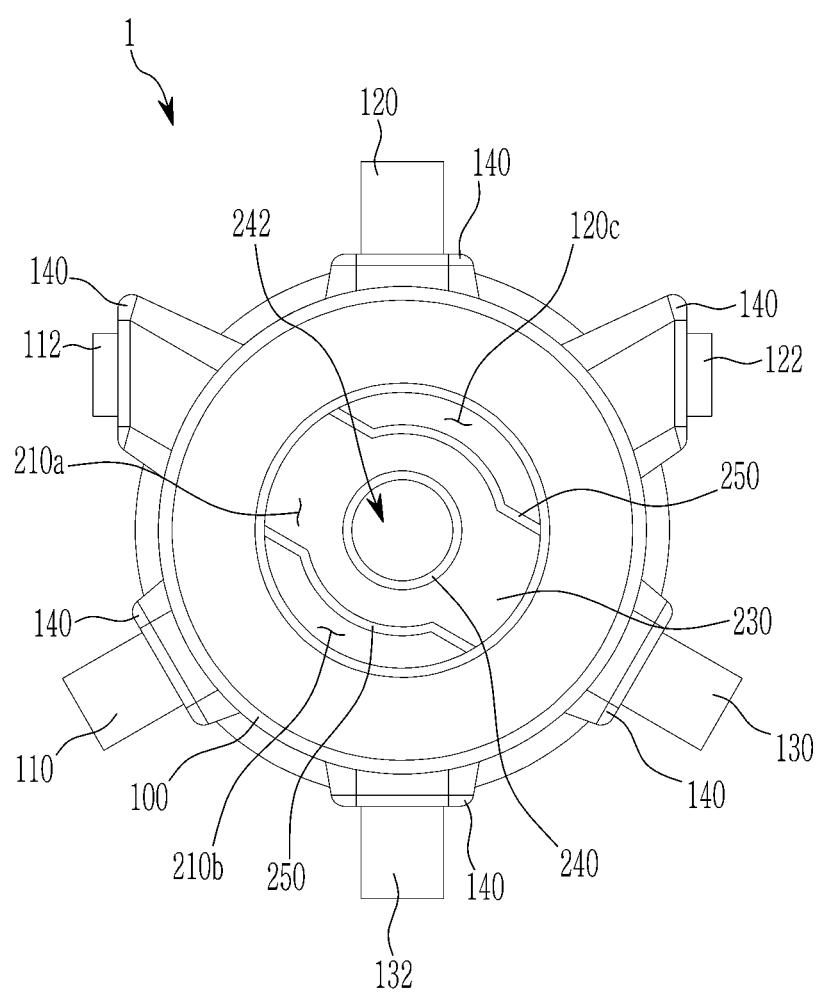
FIG. 9 is a top plan view of an external housing according to various exemplary embodiments of the present disclosure.
Figure 10:
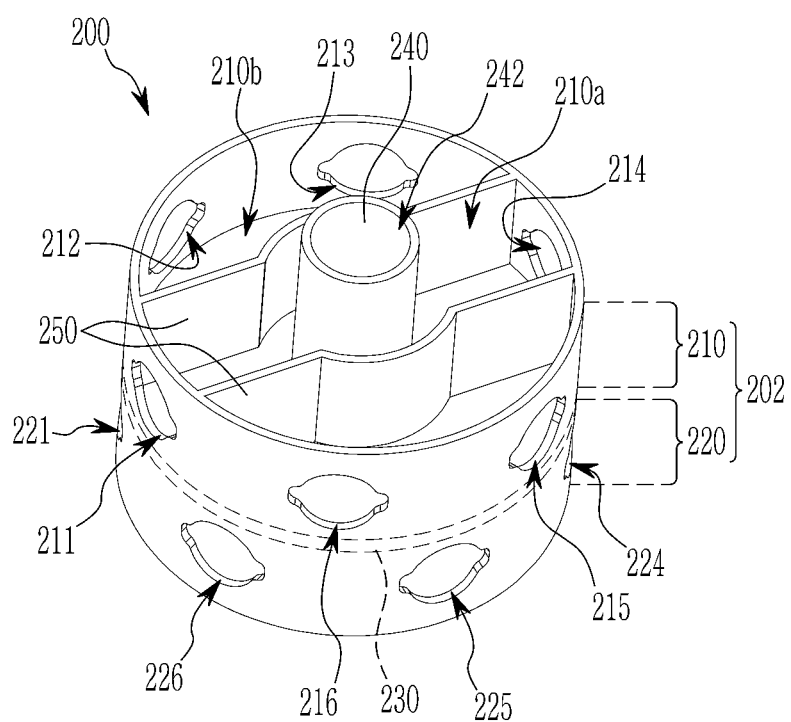
FIG. 10 is a perspective view of an internal housing applied to a multi-way coolant valve according to various exemplary embodiments of the present disclosure.
Figure 11:
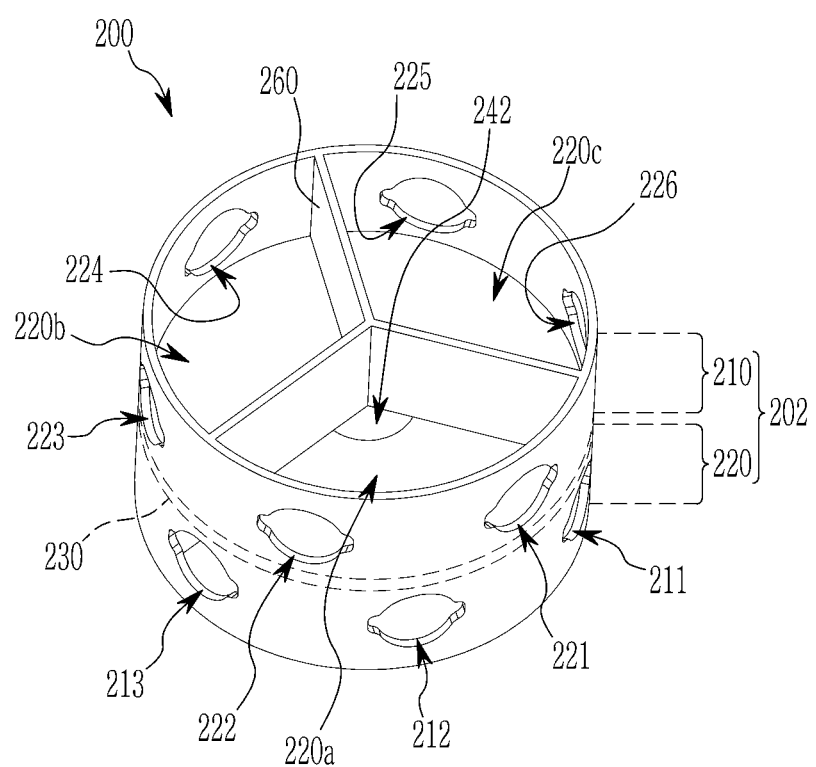
FIG. 11 is a rear perspective view of an internal housing according to various exemplary embodiments of the present disclosure.
Figure 12:
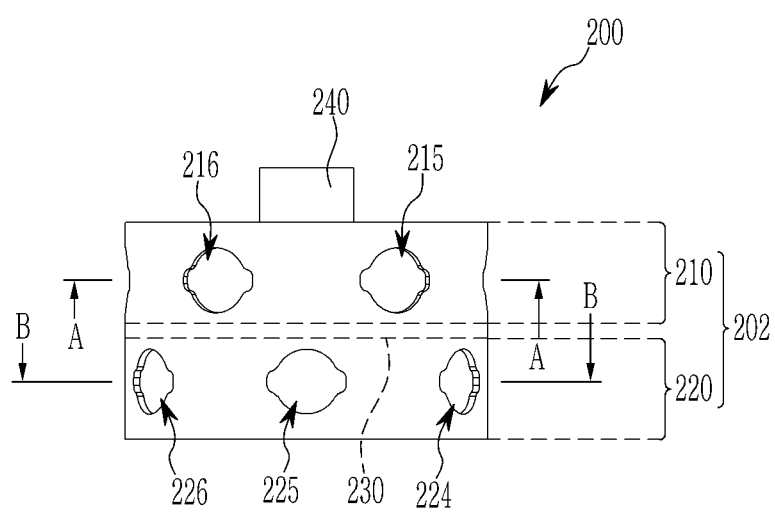
FIG. 12 is a front view of an internal housing according to various exemplary embodiments of the present disclosure.
Figure 13:
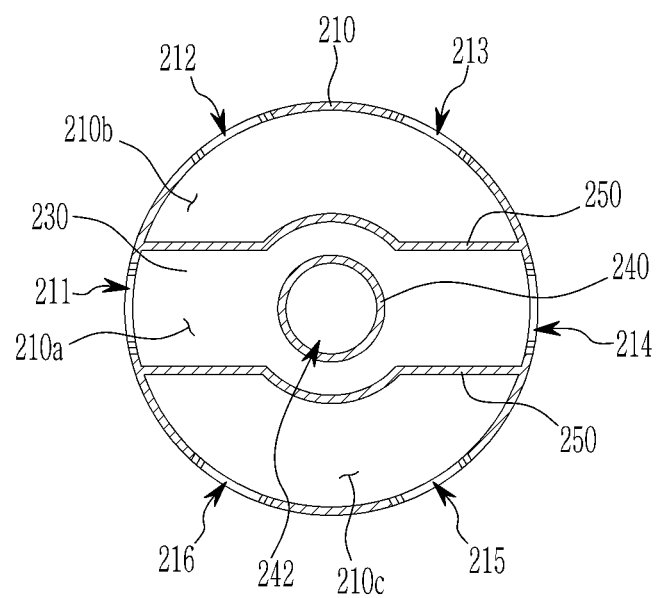
FIG. 13 is a cross-sectional view taken along a line A-A of FIG. 12.
Figure 14:
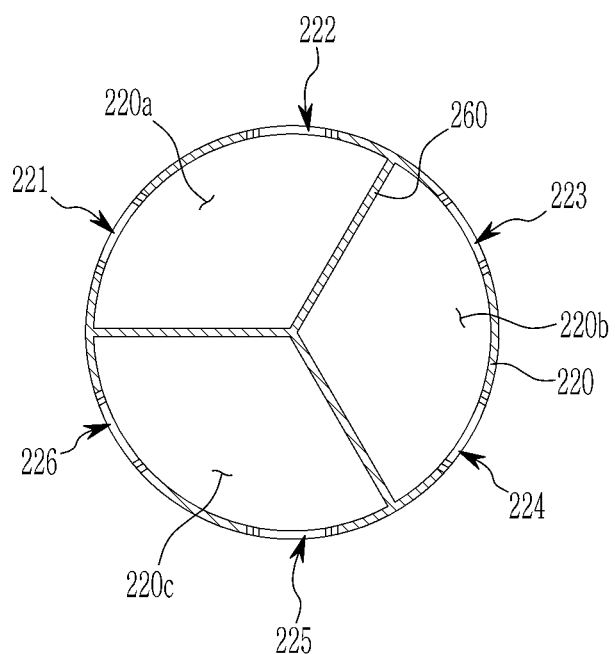
FIG. 14 is a cross-sectional view taken along a line B-B of FIG. 12.

FIG. 4 is a perspective view of a multi-way coolant valve according to various exemplary embodiments of the present disclosure, FIG. 5 is a top plan view of a multi-way coolant valve according to various exemplary embodiments of the present disclosure, FIG. 6 is a projection front view of a multi-way coolant valve according to various exemplary embodiments of the present disclosure, FIG. 7 is an exploded perspective view of a multi-way coolant valve according various exemplary embodiments of the present disclosure, FIG. 8 is a perspective view of an external housing applied to a multi-way coolant valve according to various exemplary embodiments of the present disclosure, FIG. 9 is a top plan view of an external housing according to various exemplary embodiments of the present disclosure, FIG. 10 is a perspective view of an internal housing applied to a multi-way coolant valve according to various exemplary embodiments of the present disclosure, FIG. 11 is a rear perspective view of an internal housing according to various exemplary embodiments of the present disclosure, FIG. 12 is a front view of an internal housing according to various exemplary embodiments of the present disclosure, FIG. 13 is a cross-sectional view taken along a line A-A of FIG. 12, and FIG. 14 is a cross-sectional view taken along a line B-B of FIG. 12.

As shown in FIG. 4 to FIG. 9, in the external housing 100, a first external inlet 110, a second external inlet 120, a third external inlet 130, a first external outlet 112, a second external outlet 122, and a third external outlet 132, which fluidically-communicate with the inside along the circumference of the external circumference, are formed.

Here, the first external inlet 110, the second external inlet 120, and the third external inlet 130 may be formed at positions spaced apart by 120° along the circumference of the external housing 100, respectively.

Also, the first external outlet 112, the second external outlet 122, and the third external outlet 132 may be formed in each position spaced apart at a 120° angle along the circumference of the external housing 100 between the first, second and third external inlets 110, 120, and 130, respectively, to be positioned alternately with the first external inlet 110, the second external inlet 120, and the third external inlet 130.

Here, the first water pump 20 may be mounted on the first external outlet 112, and the second water pump 30 may be mounted on the second external outlet 122, respectively (referring to FIG. 1 and FIG. 2).

In an exemplary embodiment of the present disclosure, the internal housing 200 is rotatably provided inside the external housing 100 to selectively fluidically-connect the first, second and third external inlets 110, 120, and 130 with the first, second and third external outlets 112, 122, and 132, and may be divided into two stages through which the coolant flows, respectively.

The internal housing 200, as shown in FIG. 6, FIG. 7, and FIG. 10 to FIG. 14, may include an internal body member 202, a first partition wall 230, a tank connection portion 240, a second partition wall 250, a third partition wall 260, and a plurality of penetration holes.

First, the internal body member 202 is formed in a hollow cylinder shape in which an upper surface and a lower surface are opened.

The first partition wall 230 may partition the internal body member 202 into the first internal body member 210 and the second internal body member 220 based on the height direction thereof.

That is, the first internal body member 210 may be positioned at the upper portion of the internal body member 202, and the second internal body member 220 may be positioned at the lower portion of the internal body member 202.

The tank connection portion 240 may be protruded upwardly from the first partition wall 230 at the rotation center portion of the first internal body member 210. The tank connection portion 240 may be formed in a circular pipe shape.

In the tank connection portion 240, an inflow hole 242 that fluidically-communicates with the inside of the second internal body member 220 may be formed. Accordingly, the coolant may smoothly inflow through the inflow hole 242 inside the second internal body member 220.

Here, the tank connection portion 240 may be positioned higher than the upper end portion of the first internal body member 210.

Therefore, the tank connection portion 240 may prevent the bubbles exhausted from the coolant flowing in the first internal body member 210 to the reservoir tank 10 from flowing into the second internal body member 220.

The second partition wall 250 is composed as a pair and is formed in parallel to the upper surface of the first partition wall 230 at the positions spaced from the tank connection portion 240 (referring to FIG. 10) to divide the inside of the first internal body member 210 into first, second and third internal chambers 210a, 210b, and 210c vertical to the height direction thereof.

In an exemplary embodiment of the present disclosure, the third partition wall 260 divides the inside of the second internal body member 220 into fourth, fifth and sixth internal chambers 220a, 220b, and 220c spaced at a predetermined angle along the circumferential direction based on the rotation center (referring to FIG. 11).

Here, the third partition wall 260 may divide the inside of the second internal body member 220 at a 120° angle along the circumferential direction thereof.

Also, a plurality of penetration holes may be formed along the external circumference of the first internal body member 210 and the second internal body member 220, respectively.

A plurality of penetration holes may include the first to sixth penetration holes 211, 212, 213, 214, 215, and 216 formed at the positions spaced apart at a predetermined angle along the circumference of the first internal body member 210, and the seventh to twelfth penetration holes 221, 222, 223, 224, 225, and 226 formed at the positions spaced apart at a predetermined angle along the external circumference of the second internal body member 220.

Here, the first to sixth penetration holes 211, 212, 213, 214, 215, and 216 may be formed at the positions spaced from each other at a 60° angle along a circumference of the first internal body member 210, respectively.

Furthermore, the seventh to twelfth penetration holes 221, 222, 223, 224, 225, and 226 may be formed at the positions spaced apart at a 60° angle along a circumference of the second internal body member 220, respectively.

The first to sixth penetration holes 211, 212, 213, 214, 215, and 216 constituted in the instant way may be formed in the mutually staggered positions from the seventh to twelfth penetration holes 221, 222, 223, 224, 225, and 226 along the circumferential direction of the internal housing 200.

Meanwhile, in an exemplary embodiment of the present disclosure, the first and fourth penetration holes 211 and 214 may fluidically-communicate with the first internal chamber 210a. The second and third penetration holes 212 and 213 may fluidically-communicate with the second internal chamber 210b. Furthermore, the fifth and sixth penetration holes 215 and 216 may fluidically-communicate with the third internal chamber 210c.

The seventh and eighth penetration holes 221 and 222 may fluidically-communicate with the fourth internal chamber 220a. The ninth and tenth penetration holes 223 and 224 may fluidically-communicate with the fifth internal chamber 220b. The eleventh, and twelfth penetration holes 225, and 226 may fluidically-communicate with the sixth internal chamber 220c.

Here, the external housing 100 may further include a protruded portion 140 protruding outwardly from the external circumference at the positions corresponding to the first, second and third external inlets 110, 120, and 130 and the first, second and third external outlets 112, 122, and 132 so that a space may be formed in each between the first to twelfth penetration holes 211, 212, 213, 214, 215, 216, 221, 222, 223, 224, 225, and 226 formed in the first internal body member 210 and the second internal body member 210.

In the protruded portion 140, one penetration hole among the first, second, third, fourth, fifth and sixth penetration holes 211, 212, 213, 214, 215, and 216 or one penetration hole among the seventh, eighth, ninth, tenth, eleventh and twelfth penetration holes 221, 222, 223, 224, 225, and 226 may be positioned.

That is, when the internal housing 200 is rotated by the driving unit 300 at a predetermined angle, the selected penetration holes among the first to twelfth penetration holes 211, 212, 213, 214, 215, 216, 221, 222, 223, 224, 225, and 226 may be positioned respectively in the protruded portions 140.

Accordingly, the multi-way coolant valve 1 may form the various coolant flow paths by selectively connecting the first, second and third external inlets 110, 120, and 130 to the first, second and third external outlets 112, 122, and 132.

That is, when the internal housing 200 is rotated at a predetermined interval by the selected mode of the vehicle, the first external inlet 110 may selectively fluidically-communicate with the first external outlet 112, the second external outlet 122, or the third external outlet 132.

Also, the second external inlet 120 may selectively fluidically-communicate with the first external outlet 112 or the second external outlet 122.

Furthermore, the third external inlet 130 may selectively fluidically-communicate with the first external outlet 112, the second external outlet 122, or the third external outlet 132.

Hereinafter, the operation and the action of the multi-way coolant valve 1 according to various exemplary embodiments of the present disclosure as above-described are described with reference to FIG. 15 to FIG. 18.

In an exemplary embodiment of the present disclosure, the mode may include a first mode, a second mode, a third mode and a fourth mode in which the internal housing 200 is rotated at a predetermined angle by the operation of the driving unit 300 inside the external housing 100.

That is, the multi-way coolant valve 1 may be operated in the first mode to the fourth mode, respectively.

First, the operation for the first mode is described with reference to FIG. 15.

Figure 15:
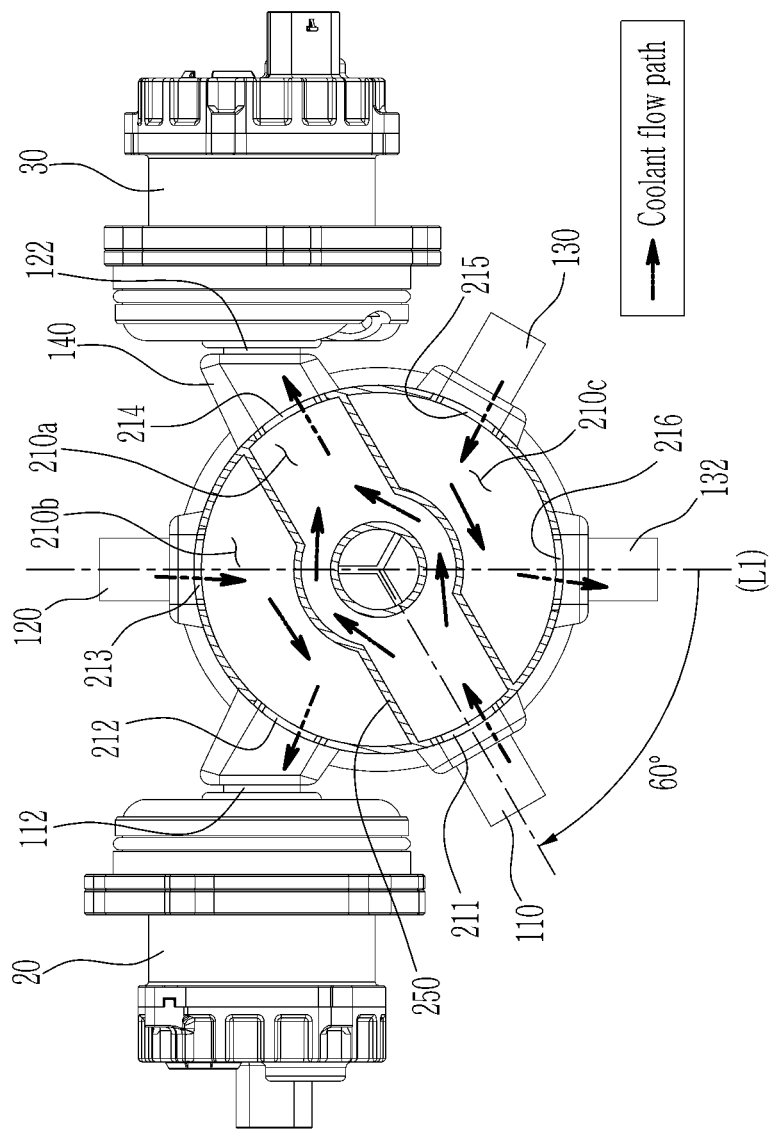
FIG. 15 is a view to explain an operation for a first mode in a multi-way coolant valve according to various exemplary embodiments of the present disclosure.

FIG. 15 is a view to explain an operation for a first mode in a multi-way coolant valve according to various exemplary embodiments of the present disclosure.

Referring to FIG. 15, in the first mode, the first external inlet 110 fluidically-communicates with the second external outlet 122 through the first internal chamber 210a.

That is, the first mode is a state in which the first internal chamber 210a of the internal housing 210 is rotated clockwise at a 60° angle based on the imaginary line L1 passing through the second external inlet 120 and the third external outlet 132.

Accordingly, the first penetration hole 211 communicating with the first internal chamber 210a may be positioned at the first external inlet 110, and the fourth penetration hole 214 may be positioned at the second external outlet 122.

Accordingly, the coolant inflowed to the first external inlet 110 may pass through the first internal chamber 210a and be expelled to the second external outlet 122.

At the same time, the second external inlet 120 fluidically-communicates with the first external outlet 112 through the second internal chamber 210b.

Accordingly, the third penetration hole 213 communicating with the second internal chamber 210b may be positioned at the second external inlet 120, and the second penetration hole 212 may be positioned at the first external outlet 112.

Accordingly, the coolant inflowed to the second external inlet 120 may pass through the second internal chamber 210b and be expelled to the first external outlet 112.

At the same time, the third external inlet 130 fluidically-communicates with the third external outlet 132 through the third internal chamber 210c.

Accordingly, the fifth penetration hole 215 communicating with the third internal chamber 210c may be positioned at the third external inlet 130, and the sixth penetration hole 216 may be positioned at the third external outlet 132.

Accordingly, the coolant inflowed to the third external inlet 130 may pass through the third internal chamber 210c and be expelled to the third external outlet 132.

In an exemplary embodiment of the present disclosure, the operation for the second mode is described with reference to FIG. 16.

Figure 16:
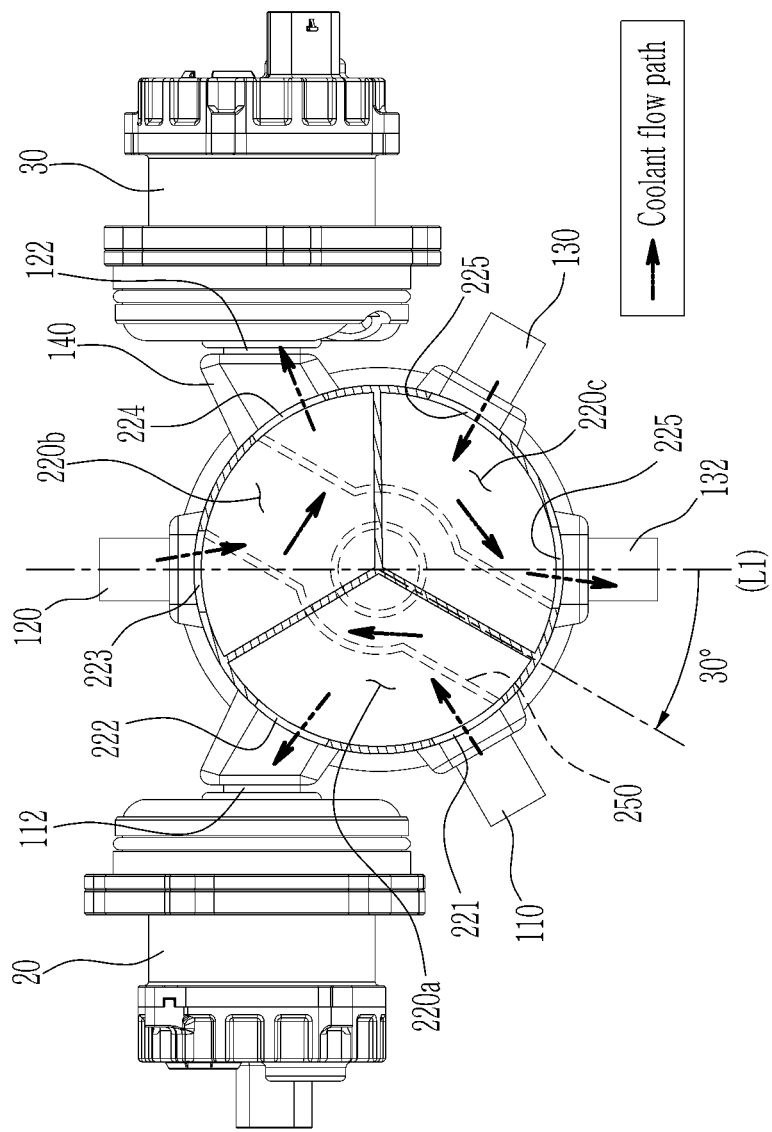
FIG. 16 is a view to explain an operation for a second mode in a multi-way coolant valve according to various exemplary embodiments of the present disclosure.

FIG. 16 is a view to explain an operation for a second mode in a multi-way coolant valve according to various exemplary embodiments of the present disclosure.

Referring to FIG. 16, in the second mode, the first external inlet 110 fluidically-communicates with the first external outlet 112 through the fourth internal chamber 220a.

That is, the second mode is a state in which the first internal chamber 210a of the internal housing 210 is rotated clockwise by a 30° angle based on the imaginary line L1 passing through the second external inlet 120 and the third external outlet 132.

Accordingly, the seventh penetration hole 221 communicating with the fourth internal chamber 220a may be positioned at the first external inlet 110, and the eighth penetration hole 222 may be positioned at the first external outlet 112.

Accordingly, the coolant inflowed to the first external inlet 110 may pass through the fourth internal chamber 220a and be expelled to the first external outlet 112.

At the same time, the second external inlet 120 fluidically-communicates with the second external outlet 122 through the fifth internal chamber 220b.

Accordingly, the ninth penetration hole 223 communicating with the fifth internal chamber 220b may be positioned at the second external inlet 120, and the tenth penetration hole 224 may be positioned at the second external outlet 122.

Accordingly, the coolant inflowed to the second external inlet 120 may pass through the fifth internal chamber 220b and be expelled to the second external outlet 122.

At the same time, the third external inlet 130 fluidically-communicates with the third external outlet 132 through the sixth internal chamber 220c.

Accordingly, the eleventh penetration hole 225 communicating with the sixth internal chamber 220c may be positioned at the third external inlet 130, and the twelfth penetration hole 226 may be positioned at the third external outlet 132.

Accordingly, the coolant inflowed to the third external inlet 130 may pass through the sixth internal chamber 210c and may be expelled to the third external outlet 132.

In an exemplary embodiment of the present disclosure, the operation for the third mode is described with reference to FIG. 17.

Figure 17:
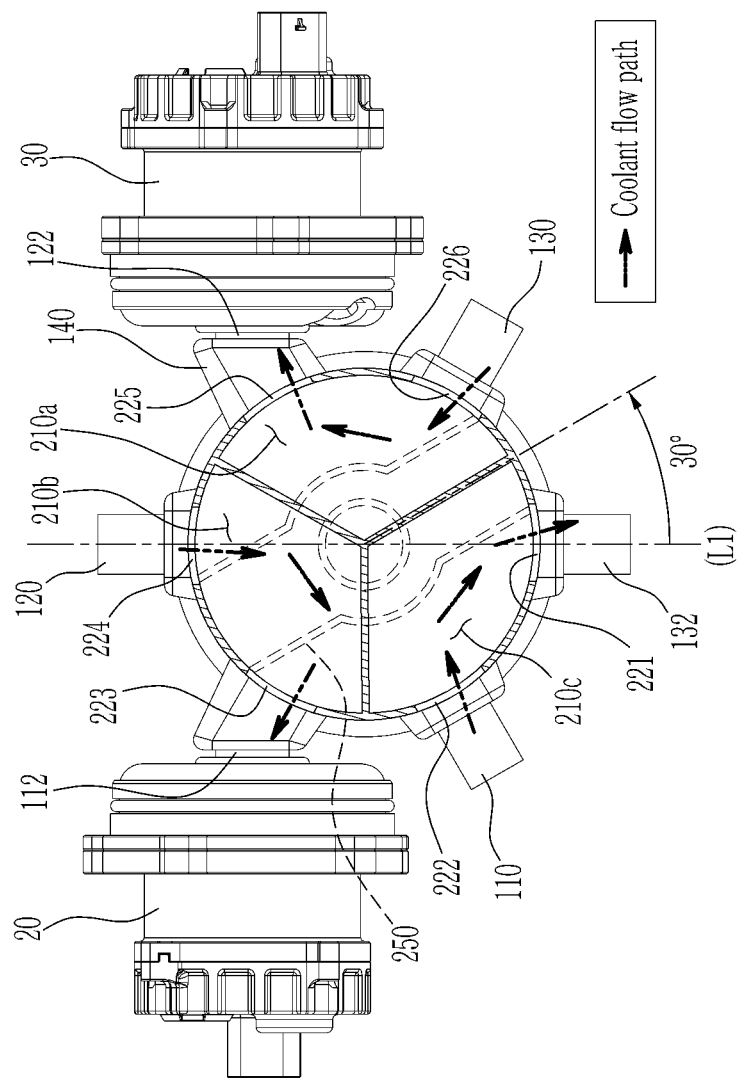
FIG. 17 is a view to explain an operation for a third mode in a multi-way coolant valve according to various exemplary embodiments of the present disclosure.

FIG. 17 is a view to explain an operation for a third mode in a multi-way coolant valve according to various exemplary embodiments of the present disclosure.

Referring to FIG. 17, in the third mode, the first external inlet 110 fluidically-communicates with the third external outlet 132 through the fourth internal chamber 220a.

That is, the third mode is a state in which the first internal chamber 210a of the internal housing 210 is rotated by 30° in the counterclockwise direction based on the imaginary line L1 passing through the second external inlet 120 and the third external outlet 132.

Accordingly, the eighth penetration hole 222 communicating with the fourth internal chamber 220a may be positioned at the first external inlet 110, and the seventh penetration hole 221 may be positioned at the third external outlet 132.

Accordingly, the coolant inflowed to the first external inlet 110 may pass through the fourth internal chamber 220a and be expelled to the third external outlet 132.

At the same time, the second external inlet 120 fluidically-communicates with the first external outlet 112 through the fifth internal chamber 220b.

Accordingly, the tenth penetration hole 224 communicating with the fifth internal chamber 220b may be positioned at the second external inlet 120, and the ninth penetration hole 223 may be positioned at the first external outlet 112.

Accordingly, the coolant inflowed to the second external inlet 120 may pass through the fifth internal chamber 220b and be expelled to the first external outlet 112.

At the same time, the third external inlet 130 fluidically-communicates with the second external outlet 122 through the sixth internal chamber 220c.

Accordingly, the twelfth penetration hole 226 communicating with the sixth internal chamber 220c may be positioned at the third external inlet 130, and the eleventh penetration hole 225 may be positioned at the second external outlet 132.

Accordingly, the coolant inflowed to the third external inlet 130 may pass through the sixth internal chamber 210c and may be expelled to the second external outlet 122.

Also, the operation for the fourth mode is described with reference to FIG. 18.

Figure 18:
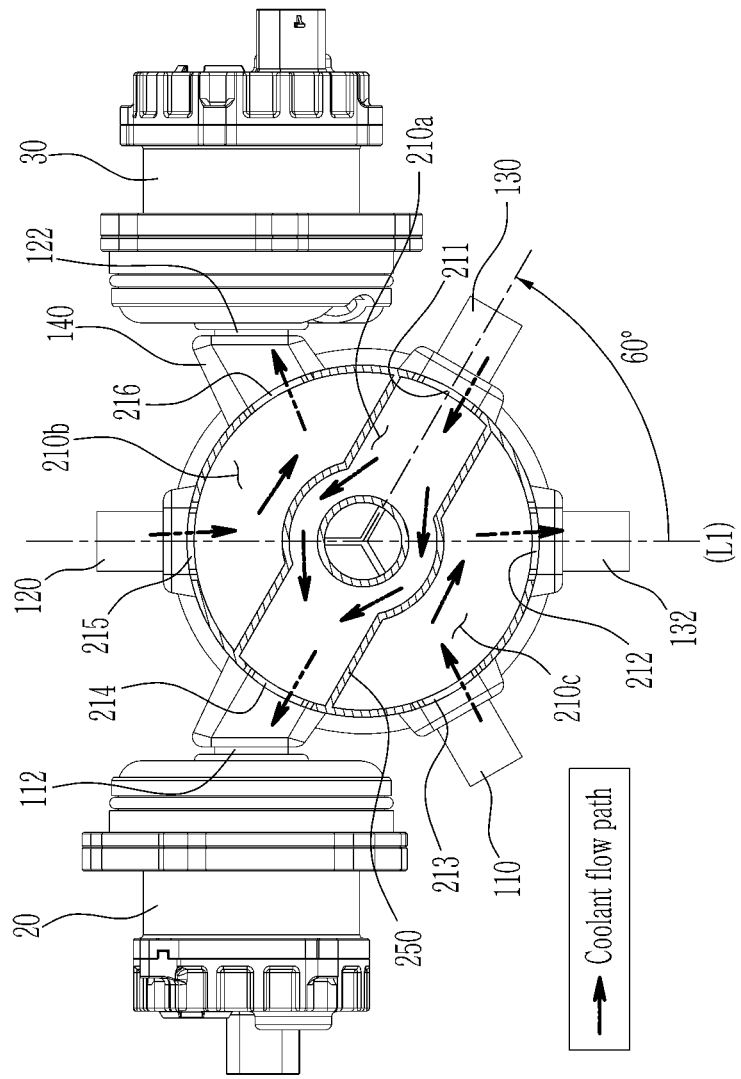
FIG. 18 is a view to explain an operation for a fourth mode in a multi-way coolant valve according to various exemplary embodiments of the present disclosure.

FIG. 18 is a view to explain an operation for a fourth mode in a multi-way coolant valve according to various exemplary embodiments of the present disclosure.

Referring to FIG. 18, in the fourth mode, the first external inlet 110 fluidically-communicates with the third external outlet 132 through the second internal chamber 210b.

That is, the fourth mode is a state in which the first internal chamber 210a of the internal housing 210 is rotated by 60° in the counterclockwise direction based on the imaginary line L1 passing through the second external inlet 120 and the third external outlet 132.

Accordingly, the third penetration hole 213 communicating with the second internal chamber 210b may be positioned at the first external inlet 110, and the second penetration hole 212 may be positioned at the third external outlet 132.

Accordingly, the coolant inflowed to the first external inlet 110 may pass through the second internal chamber 210b and may be expelled to the third external outlet 132.

At the same time, the second external inlet 120 fluidically-communicates with the second external outlet 122 through the third internal chamber 210c.

Accordingly, the fifth penetration hole 215 communicating with the third internal chamber 210c may be positioned at the second external inlet 120, and the sixth penetration hole 214 may be positioned at the second external outlet 122.

Accordingly, the coolant inflowed to the second external inlet 120 may pass through the third internal chamber 210c and may be expelled to the second external outlet 122.

Simultaneously, the third external inlet 130 fluidically-communicates with the first external outlet 112 through the first internal chamber 210a.

Accordingly, the first penetration hole 211 communicating with the first internal chamber 210a may be positioned at the third external inlet 130, and the fourth penetration hole 214 may be positioned at the first external outlet 112.

Accordingly, the coolant inflowed to the third external inlet 130 may pass through the first internal chamber 210a and may be expelled to the first external outlet 112.

Therefore, the multi-way coolant valve 1 may form a plurality of cooling flow paths to which the coolant flows between the external housing 100 and the internal housing 200 by the rotation of the internal housing 200 according to the mode of the vehicle through each operation of the first mode to the fourth mode, the number of valves applied to the heat pump system may be minimized, and the simplification of the heat pump system may be promoted.

Hereinafter, the heat pump system to which the multi-way coolant valve 1 configured as described above is applied is described with reference to FIG. 19.

Figure 19:
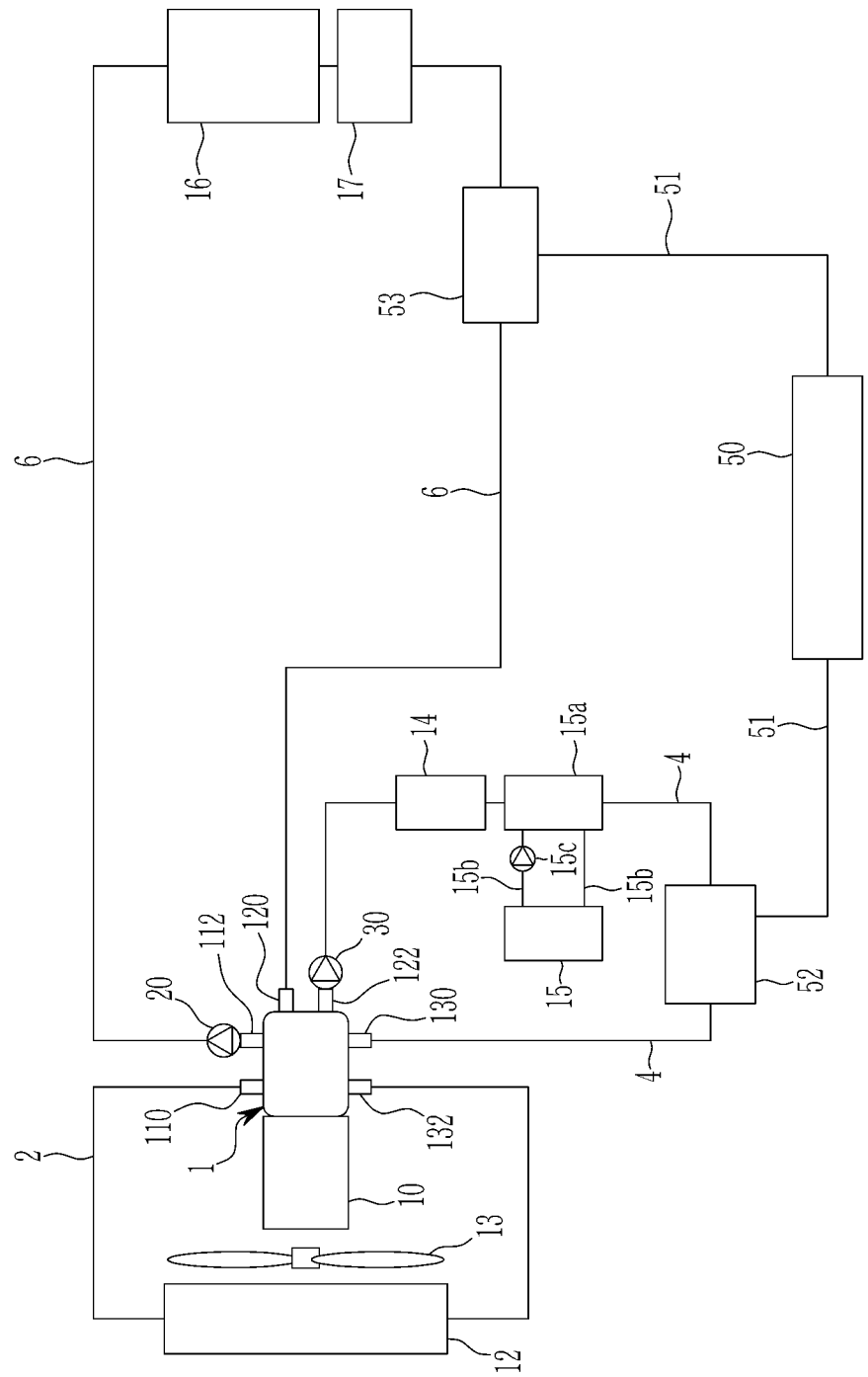
FIG. 19 is a block diagram of a heat pump system to which a multi-way coolant valve according to various exemplary embodiments of the present disclosure is applied.

FIG. 19 is a block diagram of a heat pump system to which a multi-way coolant valve according to various exemplary embodiments of the present disclosure is applied.

Referring to FIG. 19, the heat pump system may be applied to an electric vehicle and include the multi-way coolant valve 1, and a first coolant line 2, a second coolant line 4, and a battery coolant line 6, which are connected to the multi-way coolant valve 1.

First, one end portion of the first coolant line 2 may be connected to the first external inlet 110, and the other end portion of the first coolant line 2 may be connected to the third external outlet 130.

This first coolant line 2 may be provided with a radiator 12. The radiator 12 is provided at the front of the vehicle, and a cooling fan 13 is provided at the rear, and the coolant is cooled through operation of the cooling fan 13 and the heat-exchange with the outside air.

In an exemplary embodiment of the present disclosure, one end portion of the second coolant line 4 may be connected to the third external inlet 130, and the other end portion of the second coolant line 4 may be connected to the second external outlet 122.

An electrical component 14 and an oil cooler 15a may be provided in the present second coolant line 4.

The electrical component 14 includes an inverter and an on board charger (OBC). Meanwhile, the electrical component 14 may further include an electric power control unit (EPCU), or an autonomous driving controller.

This electrical component 14 may be cooled by water-type cooling by the coolant supplied to the second coolant line 4.

Accordingly, when waste heat of the electrical components is recovered in the heating mode of the vehicle, heat generated from the electric power control unit, the inverter, the charger, or the autonomous driving controller may be recovered.

Also, the oil cooler 15a is connected to cool the drive motor 15 and may be selectively cooled by the coolant supplied to the second coolant line 15a.

The first drive motor 15 is connected to the oil cooler 15a through the oil line 15b, and a hydraulic pump 15c may be provided in the oil line 15b.

Meanwhile, in an exemplary embodiment of the present disclosure, only one drive motor 15 is provided as an exemplary embodiment of the present disclosure, but is not limited thereto, and the drive motor 15 may be configured as a plurality to correspond to the front wheel and rear wheel of the vehicle.

Also, one end portion of the battery coolant line 6 may be connected to the second external inlet 120, and the other end portion of the battery coolant line 6 may be connected to the first external outlet 112.

The battery module 16 may be provided in the present battery coolant line 6. The battery module 16 supplies the power to the electrical component 14 and the drive motor 15, and is formed as a water cooling type which is cooled by the coolant flowing along the battery coolant line 6.

On the other hand, the battery coolant line 6 may be provided with a coolant heater 17.

When the temperature increase of the battery module 16 is required, the coolant heater 17 operates ON to heat the coolant circulated in the battery coolant line 6, and then the coolant whose temperature has risen may be inflowed into the battery module 16.

This coolant heater 17 may be an electric-type heater that operates according to a power supply.

In an exemplary embodiment of the present disclosure, the second coolant line 4 is provided with a heat exchanger 52 included in the air conditioning device 50. The coolant passes through the inside of the heat exchanger 52, and the heat exchanger 52 is connected to the air conditioning device 50 through the refrigerant line 51.

This heat exchanger 52 may condense or evaporate the coolant supplied through the second coolant line 4 and the refrigerant through the heat-exchange depending on the mode of the vehicle. That is, the heat exchanger 52 may be a water-cooled heat exchanger in which the coolant is inflowed.

Furthermore, the battery coolant line 6 is provided with a chiller 53 connected to the air conditioning device 50. The coolant passes through the inside of the chiller 53, and the chiller 53 is connected to the air conditioning device 50 through the refrigerant line 51.

The chiller 53 may control the coolant temperature by heat-exchanging the coolant selectively inflowed inside with the refrigerant supplied from the air conditioning device 50. Here, the chiller 53 may be a water-cooled heat exchanger in which coolant is inflowed.

In the heat pump system configured in the present way, the internal housing 200 provided in the multi-way coolant valve 1 may operate in the first mode to the fourth mode in which the internal housing 100 is rotated at a predetermined angle by the driving unit 300.

That is, the multi-way coolant valve 1 may be operated in any one selected mode among the first mode to the fourth mode.

First, the first mode may cool the electrical component 14 and the oil cooler 15a using the coolant cooled by the radiator 12 in the cooling mode of the vehicle and may cool the battery module 16 by use of the heat-exchanged coolant in the chiller 53.

The second mode may cool the electrical component 14, the oil cooler 15a, and the battery module 16 by use of the coolant cooled in the radiator 12 in the state that the air conditioning device 50 is not operated.

The third mode may recover the waste heat generated from the electrical component 14 and the oil cooler 15a by use of the coolant circulating in the second coolant line 4 in the heating mode of the vehicle, and may use the recovered waste heat for the internal heating of the vehicle.

Also, the fourth mode may recover the waste heat generated from the electrical component 14, the oil cooler 15a, and the battery module 16 by use of the coolant circulating in the second coolant line 4 and the battery coolant line 6 in the heating mode of the vehicle and may use the recovered waste heat for the internal heating of the vehicle.

In an exemplary embodiment of the present invention, the driving unit 300 is electrically connected to a controller which is configured to control operation of the driving unit 300.

Hereinafter, the operation and the action of the heat pump system configured as above-descried are described with reference to FIG. 20 to FIG. 24.

First, the operation for the first mode is described with reference to FIG. 20.

Figure 20:
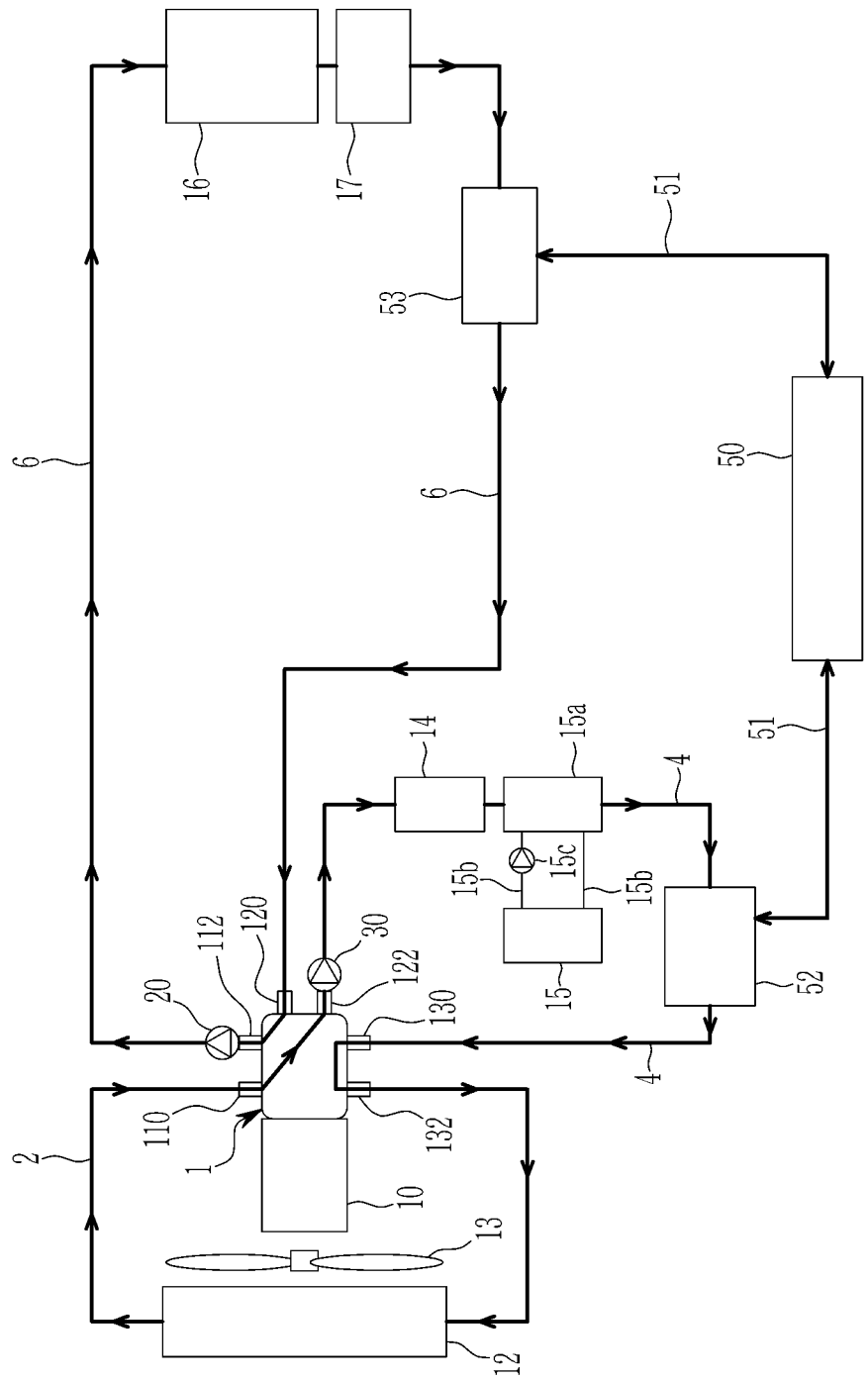
FIG. 20 is a view to explain an operation for a first mode in a heat pump system according to various exemplary embodiments of the present disclosure.

FIG. 20 is a view to explain an operation for a first mode in a heat pump system according to various exemplary embodiments of the present disclosure.

The first mode may cool the electrical component 14 and the oil cooler 15a using the coolant cooled by the radiator 12 in the cooling mode of the vehicle and may cool the battery module 16 by use of the heat-exchanged coolant in the chiller 53.

Referring to FIG. 20, in the first mode, the multi-way coolant valve 1 may connect the first coolant line 2 to the second coolant line 4 to supply the coolant cooled from the radiator 12 to the electrical component 14 and the oil cooler 15a.

At the same time, the multi-way coolant valve 1 may be operated so that the battery coolant line 6 forms a closed and sealed circuit independent of the first and second coolant lines 2 and 4.

That is, if the multi-way coolant valve 1 is operated in the first mode, the first external inlet 110 fluidically-communicates with the second external outlet 122 through the first internal chamber 210a and the third external inlet 130 fluidically-communicates with the third external outlet 132 through the third internal chamber 210c so that the first coolant line 2 is connected to the second coolant line 4.

Accordingly, the coolant flowing from the first coolant line 2 to the first external inlet 110 passes through the first internal chamber 210a and exhausts to the second external outlet 122 connected to the second coolant line 4.

The coolant that flows from the second coolant line 4 to the third external inlet 130 may pass through the third internal chamber 210c and be expelled to the third external outlet 132 connected to the first coolant line 2.

Accordingly, the coolant cooled by the radiator 12 may be circulated from the first coolant line 2 to the second coolant line 2 through the multi-way coolant valve 1 by the operation of the second water pump 30.

The coolant circulating in the second coolant line 2 may inflow to the multi-way coolant valve 1 through the third external inlet 130 and be expelled to the first coolant line 2 through the third external outlet 132 to flow back to the radiator 12.

Meanwhile, in the multi-way coolant valve 1, the second external inlet 120 fluidically-communicates with the first external outlet 112 through the second internal chamber 210b so that the battery coolant line 6 forms an independent closed and sealed circuit.

Accordingly, the coolant flowing from the battery coolant line 6 to the second external inlet 120 may pass through the second internal chamber 210b and be expelled to the first external outlet 112 connected to the battery coolant line 6.

Accordingly, the coolant may be circulated in the battery coolant line 6 by the operation of the first water pump 20.

Here, the air conditioning device 50 may be operated to perform the cooling mode of the vehicle, and the chiller 53 may heat-exchange the coolant inflowed through the battery coolant line 6 with the refrigerant to control the temperature of the coolant.

Accordingly, the coolant of a low temperature of which the heat-exchange with the refrigerant has been completed in the chiller 53 inflows to the battery module 16 according to the battery coolant line 6, efficiently cooling the battery module 16.

In an exemplary embodiment of the present disclosure, the operation for the second mode is described with reference to FIG. 21.

Figure 21:
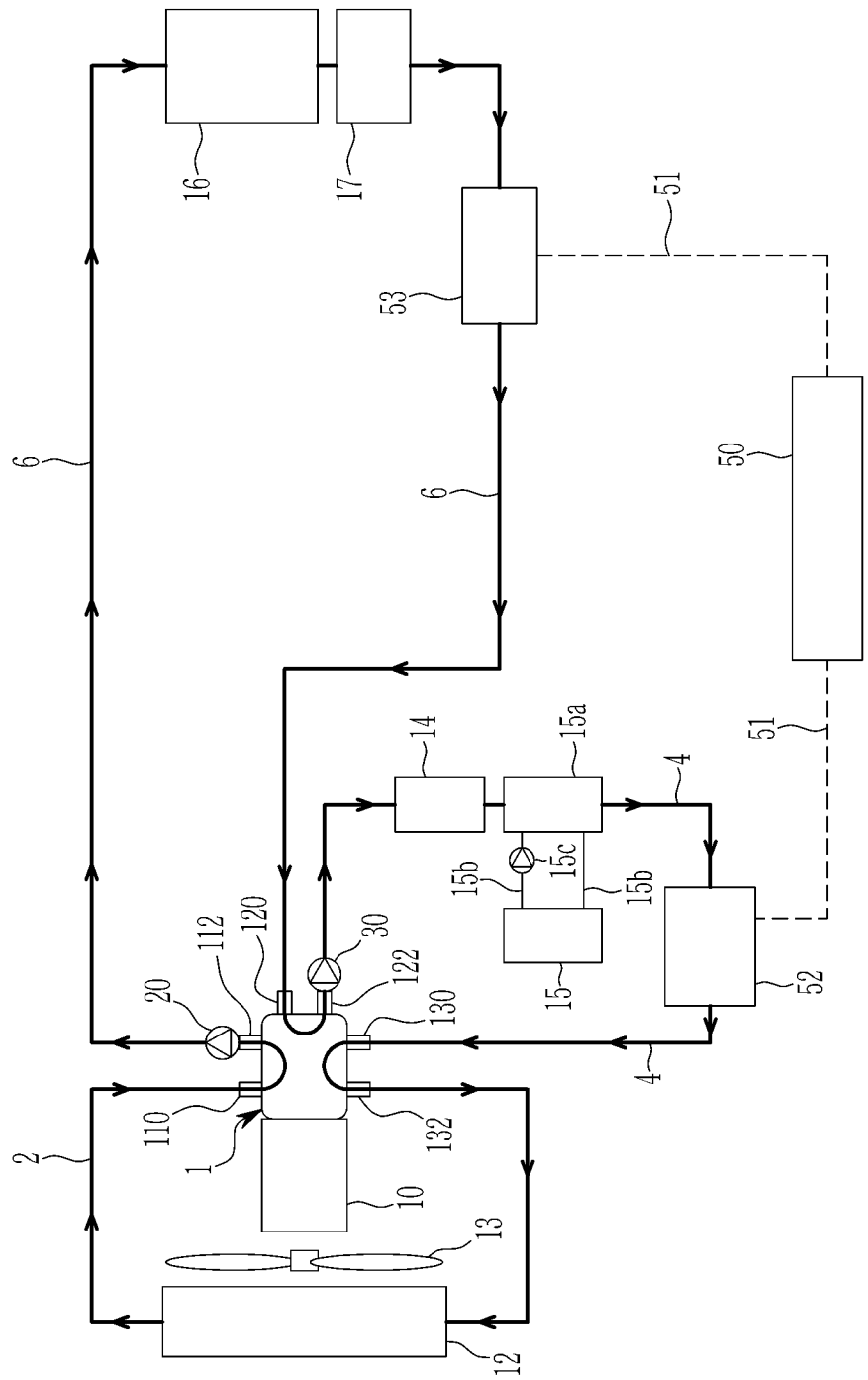
FIG. 21 is a view to explain an operation for a second mode in a heat pump system according to various exemplary embodiments of the present disclosure.

FIG. 21 is a view to explain an operation for a second mode in a heat pump system according to various exemplary embodiments of the present disclosure.

The second mode may cool the electrical component 14, the oil cooler 15a, and the battery module 16 by use of the coolant cooled in the radiator 12 in the state that the air conditioning device 50 is not operated.

Referring to FIG. 21, in the second mode, the multi-way coolant valve 1 may operate to form a circuit in which the first coolant line 2, the second coolant line 4, and the battery coolant line 6 are connected to each other for supplying the coolant cooled in the radiator 12 to the battery module 16, the electrical component 14, and the oil cooler 15a.

That is, if the multi-way coolant valve 1 is operated in the second mode,

The first external inlet 110 may fluidically-communicate with the first external outlet 112 through the fourth internal chamber 220a so that the first coolant line 2, the second coolant line 4, and the battery coolant line 6 are connected to each other.

Also, the second external inlet 120 fluidically-communicates with the second external outlet 122 through the fifth internal chamber 220b, and the third external inlet 130 fluidically-communicates with the third external outlet 132 through the sixth internal chamber 220c.

Accordingly, the coolant flowing from the first coolant line 2 to the first external inlet 110 may pass through the fourth internal chamber 220a and be expelled to the first external outlet 112 connected to the battery coolant line 6.

Also, the coolant flowing from the battery coolant line 6 to the second external inlet 120 may pass through the fifth internal chamber 220b and be expelled to the second external outlet 122 connected to the second coolant line 4.

Also, the coolant inflowed from the second coolant line 4 to the third external inlet 130 may pass through the sixth internal chamber 210c and may be expelled to the third external outlet 132 connected to the first coolant line 2.

Accordingly, while the coolant cooled in the radiator 12 may cool the electrical component 14, the oil cooler 15a, and the battery module 16 to not be overheated while circulating along the first coolant line 2, the battery coolant line 6, and the second coolant line 2 by the operation of the first and second water pumps 20 and 30.

In an exemplary embodiment of the present disclosure, the operation for the third mode is described with reference to FIG. 22.

Figure 22:
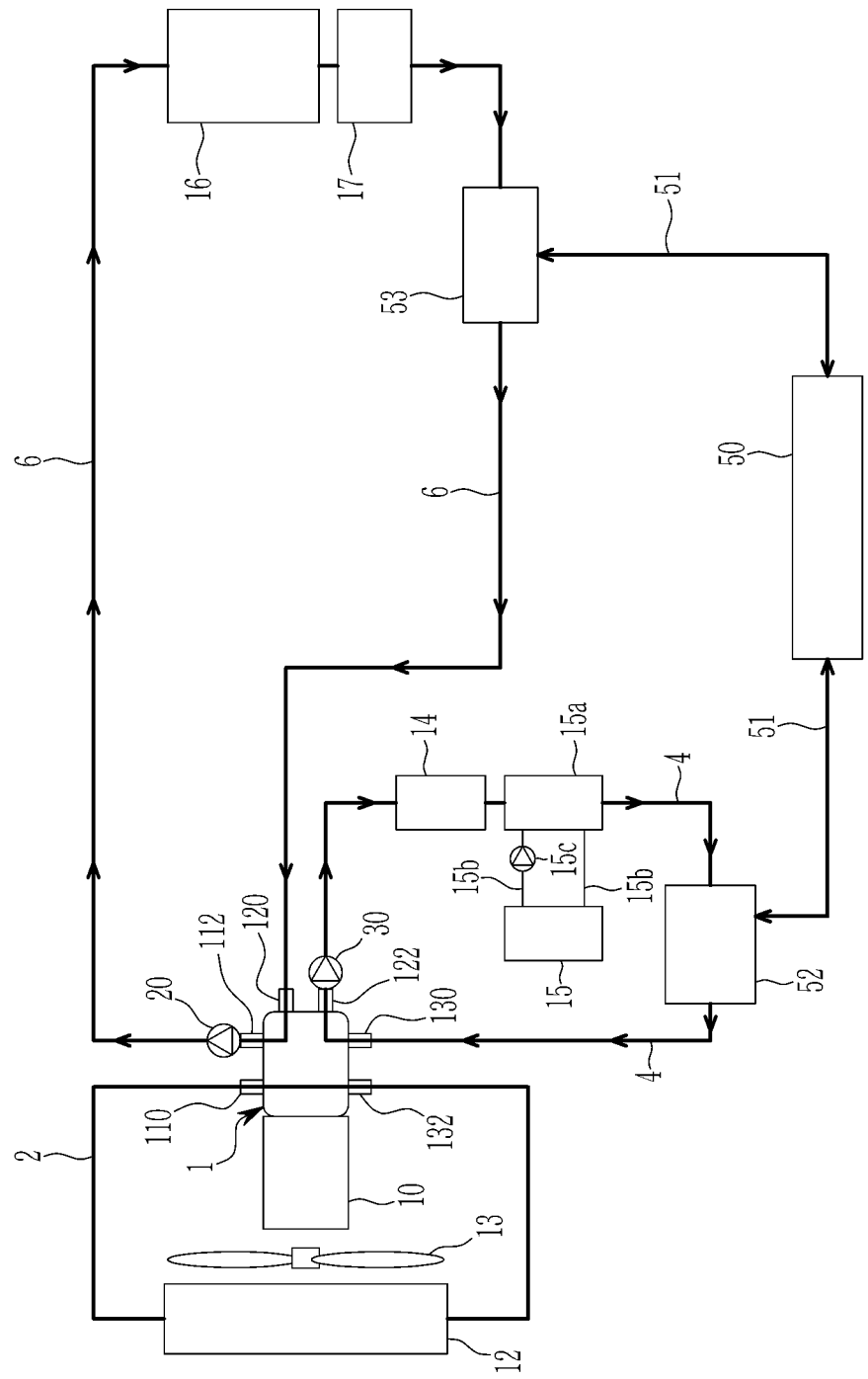
FIG. 22 is a view to explain an operation for a third mode in a heat pump system according to various exemplary embodiments of the present disclosure.

FIG. 22 is a view to explain an operation for a third mode in a heat pump system according to various exemplary embodiments of the present disclosure.

The third mode may recover the waste heat generated from the electrical component 14 and the oil cooler 15a by use of the coolant circulating in the second coolant line 4 in the heating mode of the vehicle, and may use the recovered waste heat for the internal heating of the vehicle.

Referring to FIG. 22, in the third mode, the multi-way coolant valve 1 may be operated so that the first coolant line 2, the battery coolant line 4, and the second coolant line 4 form an independent closed and sealed circuit.

Furthermore, the air conditioning device 50 may be operated so that refrigerant is supplied to the heat exchanger 52 through the refrigerant line 51.

That is, if the multi-way coolant valve 1 is operated in the third mode, the first external inlet 110 fluidically-communicates with the third external outlet 132 through the fourth internal chamber 220a so that the first coolant line 2, the battery coolant line 4, and the second coolant line 4 form an independent closed and sealed circuit, respectively.

Also, the second external inlet 120 fluidically-communicates with the first external outlet 112 through the fifth internal chamber 220b, and the third external inlet 130 fluidically-communicates with the second external outlet 122 through the sixth internal chamber 220c.

Accordingly, the coolant flowing from the first coolant line 2 to the first external inlet 110 may pass through the fourth internal chamber 220a and be expelled to the third external outlet 132 connected to the first coolant line 2.

Here, the first coolant line 2 is not connected to the first water pump 20 or the second water pump 30. Accordingly, the circulation of the coolant in the first coolant line 2 may be stopped.

Also, the coolant flowing from the battery coolant line 6 to the second external inlet 120 may pass through the fifth internal chamber 220b and be expelled to the first external outlet 112 connected to the battery coolant line 6.

Accordingly, the coolant may be circulated in the battery coolant line 6 by the operation of the first water pump 20.

Meanwhile, the coolant inflowed from the second coolant line 4 to the third external inlet 130 may pass through the sixth internal chamber 210c and be expelled to the second external outlet 122 connected to the second coolant line 4.

Accordingly, the coolant may be circulated in the second coolant line 4 by the operation of the second water pump 30.

Here, the refrigerant flows to the heat exchanger 52 by the operation of the air conditioning device 50 to recover the waste heat from the electrical component 14 and the oil cooler 15a.

That is, the coolant circulating along the second coolant line 4 increases the temperature while cooling the electrical component 14 and the oil cooler 15a. The coolant with the increased temperature is inflowed into the heat exchanger 52.

At the present time, the heat exchanger 52 may be used for the indoor heating of the vehicle by recovering the waste heat from the coolant through the heat-exchange of each coolant with the supplied refrigerant.

Also, the operation for the fourth mode is described with reference to FIG. 23.

Figure 23:
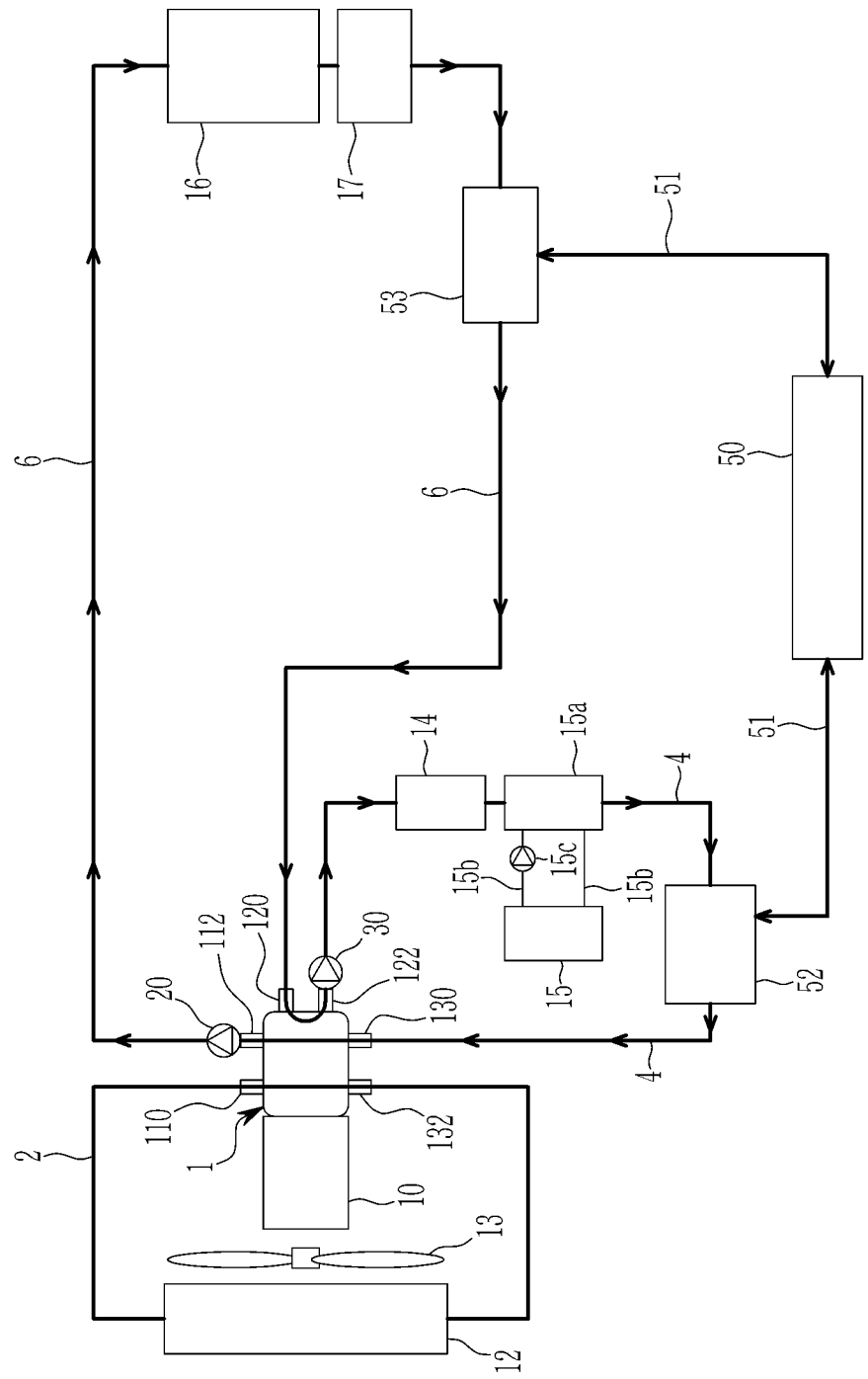
FIG. 23 is a view to explain an operation for a fourth mode in a heat pump system according to various exemplary embodiments of the present disclosure.

FIG. 23 is a view to explain an operation for a fourth mode in a heat pump system according to various exemplary embodiments of the present disclosure.

The fourth mode may recover the waste heat generated from the electrical component 14, the oil cooler 15a, and the battery module 16 by use of the coolant circulating in the second coolant line 4 and the battery coolant line 6 in the heating mode of the vehicle and may use the recovered waste heat for the internal heating of the vehicle.

Referring to FIG. 23, in the fourth mode, the multi-way coolant valve 1 may be operated so that the first coolant line 2 forms an independent closed and sealed circuit, and may be operated to form one circuit in which the battery coolant line 6 and the second coolant line 4 are interconnected to recover the waste heat from the electrical component 14, the oil cooler 15a, and the battery module 16.

Also, the air conditioning device 50 may be operated so that the refrigerant is supplied to the heat exchanger 52 and the chiller 53 through the refrigerant line 51.

That is, when the multi-way coolant valve 1 is operated in the fourth mode, the first external inlet 110 fluidically-communicates with the third external outlet 132 through the second internal chamber 210b so that the first coolant line 2 forms an independent closed and sealed circuit.

Also, the second external inlet 120 fluidically-communicates with the second external outlet 122 through the third internal chamber 210c, and the third external inlet 130 fluidically-communicates with the first external outlet 112 the first internal chamber 210a to form a circuit where the battery coolant line 6 and the second coolant line 4 are interconnected to each other.

Accordingly, the coolant flowing from the first coolant line 2 to the first external inlet 110 may pass through the second internal chamber 210b and be expelled to the third external outlet 132 connected to the first coolant line 2.

Here, the first coolant line 2 is not connected to the first water pump 20 or the second water pump 30. Accordingly, the circulation of coolant in the first coolant line 2 may be stopped.

Meanwhile, the coolant flowing from the battery coolant line 6 to the second external inlet 120 may pass through the third internal chamber 210c and be expelled to the second external outlet 122 connected to the second coolant line 4.

Also, the coolant inflow from the second coolant line 4 to the third external inlet 130 may pass through the first internal chamber 210a and be expelled to the first external outlet 112 connected to the battery coolant line 6.

Accordingly, the second coolant line 4 and the battery coolant line 6 are interconnected to each other by the operation of the multi-way coolant valve 1, and the coolant may be circulated in the second coolant line 4 and the battery coolant line 6 by the operation of the first and second water pumps 20 and 30.

Here, the refrigerant flows to the heat exchanger 52 and the chiller 53 by the operation of the air conditioning device 50 to recover the waste heat from the electrical component 14, the oil cooler 15a, and the battery module 16, respectively.

That is, the coolant circulating along the second coolant line 4 and the battery coolant line 6 increases the temperature while cooling the electrical component 14, the oil cooler 15a, and the battery module 16. The coolant with increased temperature inflows into the heat exchanger 52 and the chiller 53.

At the present time, the heat exchanger 52 and the chiller 53 may recover the waste heat from the coolant through the heat-exchange of each coolant with the supplied refrigerant to be used for the indoor heating of the vehicle.

Therefore, according to the multi-way coolant valve 1 and the heat pump system having the same according to various exemplary embodiments of the present disclosure configured as described above, a plurality of cooling flow paths through which the coolant flows between the external housing 100 and the internal housing 200 are formed by the rotation of the internal housing 200 according to the mode of the vehicle, minimizing the number of valves applied to the heat pump system and promoting the unification and the simplification of the heat pump system.

Furthermore, the present disclosure may facilitate the valve control because a plurality of cooling flow paths are formed between the external housing 100 and the internal housing 200 while the internal housing 200 is rotated at a predetermined angle interval.

Furthermore, through the simplification of the entire system, it is possible to reduce a manufacturing cost and weight, and improve space utilization.

Furthermore, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by a plurality of control devices, or an integrated single control device.

In various exemplary embodiments of the present disclosure, the control device may be implemented in a form of hardware or software, or may be implemented in a combination of hardware and software.

Furthermore, the terms such as "unit", "module", etc. Included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described to explain certain principles of the present disclosure and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A multi-way coolant valve apparatus comprising:
an external housing in which a first external inlet, a second external inlet, a third external inlet, a first external outlet, a second external outlet, and a third external outlet are formed; and
an internal housing provided rotatably inside the external housing to selectively fluidically-connect the first, second and third external inlets, and the first, second and third external outlets, and divided into two stages through which a coolant flows respectively,
wherein as the internal housing rotates at a predetermined interval in a selected mode of the vehicle, the first external inlet selectively fluidically-communicates with the first external outlet, the second external outlet, or the third external outlet,
the second external inlet selectively fluidically-communicates with the first external outlet or the second external outlet, and
the third external inlet selectively fluidically-communicates with the first external outlet,
the second external outlet, or the third external outlet,
wherein the internal housing further includes:
a hollow internal body member of which upper and lower surfaces are opened; and
a first partition wall partitioning the internal body member into a first internal body member and a second internal body member in a height direction of the internal body member.

2. The multi-way coolant valve apparatus of claim 1, wherein the internal housing further includes:
a tank connection portion formed at a rotation center of the first internal body member and fluidically-communicating with the second internal body member;
a pair of second partition walls formed in parallel with a gap spaced from the tank connection portion to divide the inside of the first internal body member into first, second and third internal chambers, which are formed vertical to the height direction;
a third partition wall dividing the inside of the second internal body member into fourth, fifth and sixth internal chambers spaced from each other at a predetermined angle in a circumferential direction based on the rotation center; and
a plurality of penetration holes respectively formed along external circumferences of the first internal body member and the second internal body member.

3. The multi-way coolant valve apparatus of claim 2, wherein the tank connection portion is positioned higher than an upper end portion of the first internal body member.

4. The multi-way coolant valve apparatus of claim 3, wherein the first, second, third, fourth, fifth and sixth penetration holes are formed at positions staggered from the seventh, eighth, ninth, tenth, eleventh and twelfth penetration holes, respectively.

5. The multi-way coolant valve apparatus of claim 3,
wherein the first, second, third, fourth, fifth and sixth penetration holes are respectively formed at positions spaced from each other at a 60° angle along a circumference of the first internal body member, and
wherein the seventh, eighth, ninth, tenth, eleventh and twelfth penetration holes are formed respectively at positions spaced apart at a 60° angle along a circumference of the second internal body member.

6. The multi-way coolant valve apparatus of claim 2, wherein the plurality of penetration holes include:
first, second, third, fourth, fifth and sixth penetration holes formed at a position spaced at a predetermined first angle along the external circumference of the first internal body member; and
seventh, eighth, ninth, tenth, eleventh and twelfth penetration holes formed at a position spaced at a predetermined second angle along the external circumference of the second internal body member.

7. The multi-way coolant valve apparatus of claim 6,
wherein the first and fourth penetration holes fluidically-communicate with the first internal chamber,
wherein the second and third penetration holes fluidically-communicate with the second internal chamber,
wherein the fifth and sixth penetration holes fluidically-communicate with the third internal chamber,
wherein the seventh and eighth penetration holes fluidically-communicate with the fourth internal chamber,
wherein the ninth and tenth penetration holes fluidically-communicate with the fifth internal chamber, and
wherein the eleventh and twelfth penetration holes fluidically-communicate with the sixth internal chamber.

8. The multi-way coolant valve apparatus of claim 7, wherein a water pump is mounted on the first external outlet and the second external outlet, respectively.

9. The multi-way coolant valve apparatus of claim 8, wherein the selected mode includes a first mode, a second mode, a third mode and a fourth mode in which the internal housing rotates at a predetermined angle inside the external housing.

10. The multi-way coolant valve apparatus of claim 9, wherein
in the first mode,
the first external inlet fluidically-communicates with the second external outlet through the first internal chamber through the first internal chamber,
the second external inlet fluidically-communicates with the first external outlet through the second internal chamber through the second internal chamber, and
the third external inlet fluidically-communicates with the third external outlet through the third internal chamber.

11. The multi-way coolant valve apparatus of claim 9, wherein
in the second mode,
the first external inlet fluidically-communicates with the first external outlet through the fourth internal chamber,
the second external inlet fluidically-communicates with the second external outlet through the fifth internal chamber, and
the third external inlet fluidically-communicates with the third external outlet through the sixth internal chamber.

12. The multi-way coolant valve apparatus of claim 9, wherein
in the third mode,
the first external inlet fluidically-communicates with the third external outlet through the fourth internal chamber,
the second external inlet fluidically-communicates with the first external outlet through the fifth internal chamber, and
the third external inlet fluidically-communicates with the second external outlet through the sixth internal chamber.

13. The multi-way coolant valve apparatus of claim 9, wherein
in the fourth mode,
the first external inlet fluidically-communicates with the third external outlet through the second internal chamber,
the second external inlet fluidically-communicates with the second external outlet through the third internal chamber, and
the third external inlet fluidically-communicates with the first external outlet through the first internal chamber.

14. The multi-way coolant valve apparatus of claim 2, wherein the third partition wall divides the interior of the second internal body member at a 120° angle along the circumferential direction.

15. The multi-way coolant valve apparatus of claim 2, wherein the external housing further includes a protruded portion protruding outwardly from the external circumference of the external housing in a position corresponding to the first, second and third external inlets and the first, second and third external outlets so that a space is respectively formed between the penetration holes respectively formed in the first internal body member and the second internal body member.

16. The multi-way coolant valve apparatus of claim 1, wherein at an upper portion of the external housing, a mounting portion provided with a connection hole protrudes to be fluidically-communicated with a reservoir tank in a state that the reservoir tank is mounted to the mounting portion.

17. The multi-way coolant valve apparatus of claim 1, further including a driving unit connected to a rotation center of the internal housing and selectively rotating the internal housing from the inside of the external housing.

18. The multi-way coolant valve apparatus of claim 1,
wherein the first external inlet, the second external inlet, and the third external inlet are formed at positions spaced at a 120° angle along a circumference of the external housing,
wherein the first external outlet, the second external outlet, and third external outlet are formed at positions spaced apart at a 120° angle along the circumference of the external housing between each of the first, second and third external inlets to be staggered with the first external inlet, the second external inlet, and the third external inlet.

19. A heat pump system comprising:
a multi-way coolant valve apparatus of claim 1,
a first coolant line connected to the first external inlet and the third external outlet, respectively, and provided with a radiator;
a battery coolant line connected to the second external inlet and the first external outlet, respectively, and provided with a battery module; and
a second coolant line connected to the third external inlet and the second external outlet, respectively, and provided with an electrical component and an oil cooler,
wherein a chiller connected to an air conditioning device is provided in the battery coolant line, and
a heat exchanger included in the air conditioning device is provided in the second coolant line,
wherein the selected mode includes a first mode, a second mode, a third mode and a fourth mode, and
wherein the internal housing provided in the multi-way coolant valve apparatus is operated with the first mode, the second mode, the third mode and the fourth mode in which the internal housing rotates at the predetermined interval inside the external housing.

20. The heat pump system of claim 19, wherein
in the first mode, the multi-way coolant valve apparatus is configured to connect the first coolant line to the second coolant line to supply the coolant cooled in the radiator to the electrical component and the oil cooler, and operates so that the battery coolant line forms a closed and sealed circuit independent from the first and second coolant lines.

21. The heat pump system of claim 19, wherein
in the second mode, the multi-way coolant valve apparatus is configured to operate to form one circuit in which the first coolant line, the battery coolant line, and the second coolant line are connected to each other to supply the coolant cooled in the radiator to the electrical component, the oil cooler, and the battery module.

22. The heat pump system of claim 19, wherein
in the third mode, the multi-way coolant valve apparatus is configured to operate so that the first coolant line, the battery coolant line, and the second coolant line respectively form an independent closed and sealed circuit, and refrigerant flows to the heat exchanger by the operation of the air conditioning device to recover waste heat from the electrical component and the oil cooler.

23. The heat pump system of claim 19, wherein
in the fourth mode, the multi-way coolant valve apparatus is configured to operate so that the first coolant line forms an independent closed and sealed circuit, operates to form one circuit in which the battery coolant line and the second coolant line are connected to each other to recover waste heat from the electrical component and the oil cooler, and the battery module, and refrigerant flows to the heat exchanger and the chiller by the operation of the air conditioning device.

* * * * *